United States Patent
Waltz et al.

(10) Patent No.: US 11,992,806 B2
(45) Date of Patent: May 28, 2024

(54) FOUR-WAY CONVERSION CATALYST HAVING IMPROVED FILTER PROPERTIES

(71) Applicant: BASF Corporation, Florham Park, NJ (US)

(72) Inventors: Florian Waltz, Hannover (DE); Attilio Siani, Shanghai (CN); Thomas Schmitz, Hannover (DE); Stephan Siemund, Hannover (DE); David Schlereth, Nienburg/Weser (DE); Hao Li, Nienburg/Weser (DE)

(73) Assignee: BASF Corporation, Florham Park, NJ (US)

( * ) Notice: Subject to any disclaimer, the term of this patent is extended or adjusted under 35 U.S.C. 154(b) by 474 days.

(21) Appl. No.: 16/965,449

(22) PCT Filed: Feb. 4, 2019

(86) PCT No.: PCT/EP2019/052635
§ 371 (c)(1),
(2) Date: Jul. 28, 2020

(87) PCT Pub. No.: WO2019/149929
PCT Pub. Date: Aug. 8, 2019

(65) Prior Publication Data
US 2020/0353410 A1    Nov. 12, 2020

(30) Foreign Application Priority Data
Feb. 5, 2018    (EP) ..................... 18155095

(51) Int. Cl.
*B01J 21/04*    (2006.01)
*B01D 53/94*    (2006.01)
(Continued)

(52) U.S. Cl.
CPC .......... *B01D 53/945* (2013.01); *B01J 23/63* (2013.01); *F01N 3/022* (2013.01); *F01N 3/035* (2013.01);
(Continued)

(58) Field of Classification Search
CPC ... B01J 21/04; B01J 23/10; B01J 23/42; B01J 23/44; B01J 23/46; B01J 23/462;
(Continued)

(56) References Cited

U.S. PATENT DOCUMENTS

| 8,012,439 B2 | 9/2011 | Arnold et al. |
| 8,709,349 B2 * | 4/2014 | Miyairi .............. B01D 46/2429 422/177 |

(Continued)

FOREIGN PATENT DOCUMENTS

| CN | 102939445 A | 12/2015 |
| EP | 2 042 226 A2 | 4/2009 |

(Continued)

OTHER PUBLICATIONS

International Search Report dated Apr. 1, 2019 in PCT/EP2019/052635 filed on Feb. 4, 2019.
(Continued)

*Primary Examiner* — Cam N. Nguyen
(74) *Attorney, Agent, or Firm* — DLA Piper LLP (US)

(57) ABSTRACT

A four-way conversion catalyst for the treatment of an exhaust gas stream of a gasoline engine, the catalyst comprising a porous wall flow filter substrate comprising an inlet end, an outlet end, a substrate axial length extending between the inlet end and the outlet end, and a plurality of passages defined by porous internal walls of the porous wall flow filter substrate, wherein the plurality of passages comprise inlet passages having an open inlet end and a closed outlet end, and outlet passages having a closed inlet end and (Continued)

an open outlet end; wherein in the pores of the porous internal walls and on the surface of the porous internal walls, which surface defines the interface between the porous internal walls and the passages, the catalyst comprises a three-way conversion catalytic coating comprising an oxygen storage compound and a platinum group metal supported on a refractory metal oxide; wherein in the pores of the porous internal walls, the three-way conversion catalytic coating is present as in-wall-coating and on the surface of the porous internal walls, the three-way conversion catalytic coating is present as on-wall-coating; wherein in addition to said three-way conversion catalytic coating, the catalyst comprises no further coating in the pores of the porous internal walls and no further coating on the surface of the porous internal walls.

18 Claims, 13 Drawing Sheets

(51) Int. Cl.
| | |
|---|---|
| *B01J 23/10* | (2006.01) |
| *B01J 23/42* | (2006.01) |
| *B01J 23/44* | (2006.01) |
| *B01J 23/46* | (2006.01) |
| *B01J 23/63* | (2006.01) |
| *F01N 3/022* | (2006.01) |
| *F01N 3/035* | (2006.01) |
| *F01N 3/10* | (2006.01) |

(52) U.S. Cl.
CPC ........ *F01N 3/101* (2013.01); *B01D 2255/102* (2013.01); *B01D 2255/206* (2013.01); *B01D 2255/407* (2013.01); *B01D 2255/9155* (2013.01); *F01N 2330/06* (2013.01)

(58) Field of Classification Search
CPC ........ B01J 23/464; B01J 23/468; B01J 23/63; B01J 37/0201; B01J 37/0213; B01J 37/0215; B01J 37/024; B01J 37/04; B01D 53/945; F01N 3/022; F01N 3/035; F01N 3/101
USPC ........ 502/258–262, 304, 332–334, 339, 349, 502/355, 415, 439
See application file for complete search history.

(56) References Cited

U.S. PATENT DOCUMENTS

| | | | | |
|---|---|---|---|---|
| 8,758,695 | B2* | 6/2014 | Neubauer | B01J 37/0248 422/177 |
| 8,815,189 | B2* | 8/2014 | Arnold | F01N 13/0097 60/299 |
| 8,845,974 | B2* | 9/2014 | Li | C04B 38/0006 422/177 |
| 9,744,529 | B2* | 8/2017 | Xue | B01J 21/066 |
| 9,981,258 | B2* | 5/2018 | Xue | B01J 37/0244 |
| 10,677,124 | B2* | 6/2020 | Otsuka | F01N 3/0222 |
| 10,704,440 | B2* | 7/2020 | Otsuka | F01N 3/022 |
| 11,181,023 | B2* | 11/2021 | Cravillon | B01J 37/0248 |
| 11,185,819 | B2* | 11/2021 | Cravillon | F01N 3/035 |
| 11,203,958 | B2* | 12/2021 | Clowes | F01N 3/023 |
| 11,260,372 | B2* | 3/2022 | Xue | B01J 37/0201 |
| 2009/0087365 | A1 | 4/2009 | Klingmann et al. | |
| 2010/0275579 | A1* | 11/2010 | Klingmann | B01J 37/0244 422/310 |
| 2012/0124974 | A1 | 5/2012 | Li et al. | |
| 2012/0288427 | A1* | 11/2012 | Grubert | F01N 13/009 427/230 |
| 2014/0161693 | A1* | 6/2014 | Brown | F01N 3/103 60/297 |
| 2014/0301924 | A1 | 10/2014 | Morgan | |
| 2015/0152768 | A1 | 6/2015 | Arulraj et al. | |
| 2015/0321184 | A1* | 11/2015 | Fedeyko | B01J 29/763 502/328 |
| 2018/0163596 | A1* | 6/2018 | Punke | B01J 23/44 |
| 2019/0009254 | A1 | 1/2019 | Clowes et al. | |
| 2020/0368727 | A1* | 11/2020 | Schmitz | B01J 35/1019 |
| 2021/0293168 | A1* | 9/2021 | Schlereth | B01D 53/945 |

FOREIGN PATENT DOCUMENTS

| | | |
|---|---|---|
| JP | H09-173866 A | 7/1997 |
| JP | H09-220423 A | 8/1997 |
| JP | 2012-518753 A | 8/2012 |
| WO | WO2011133503 A1 | 10/2011 |
| WO | WO 2017/109514 A1 | 6/2017 |

OTHER PUBLICATIONS

International Preliminary Report on Patentability and Written Opinion dated Aug. 11, 2020 in PCT/EP2019/052635 (English Translation only), 6 pages.
Notice of Reasons for Refusal dated Nov. 29, 2022, of counterpart Japanese Patent Application No. 2020-563812, along with an English translation.

* cited by examiner

FOUR-WAY CONVERSION CATALYST HAVING IMPROVED FILTER PROPERTIES

The present invention relates to a four-way conversion catalyst for the treatment of an exhaust gas stream of a gasoline engine wherein said catalyst comprises a porous wall flow filter substrate comprising an in-wall coating and an on-wall coating. Further, the present invention relates to a process for the preparation of said catalyst. Yet further, the present invention relates an exhaust gas treatment system comprising said catalyst.

Four-way conversion (FWC) catalysts can be used in gasoline applications to filter particulate matter emitted by the respective engine in order to comply with future stringent emission particle number emission regulations (Euro6c). In current state-of-the-art FWC catalysts the catalytic washcoat is applied in the filters wall (full in-wall coating) in order to minimize the backpressure increase over the raw substrate. U.S. 2012/124974 A1 discloses a catalyst which comprises a wall-flow substrate which in turn comprises a coating permeating the walls of the substrate and a coating which is disposed on the walls of the substrate. However, the only example of U.S. 2012/124974 A1 describing a catalyst with the catalytic washcoat in the filter walls, as mentioned above, is the (comparative) example 1 showing a one-washcoat configuration. In order to achieve the desired particle filtration efficiency, the catalyst loading applied on the particulate filter is usually varied, in particular a higher catalyst loading is used to achieve a higher filtration efficiency. Furthermore, the desired filtration efficiency has to be achieved already in the fresh state of the filter, thus without any ash or soot which would accumulate on the filter during usage on the vehicle. However, higher catalyst loadings lead to increased back-pressure in the after-treatment system and leads to steeper back-pressure increase occurring during the FWC life-time in the vehicle. Such steep back-pressure increase needs to be avoided to vehicle power and fuel economy drawbacks.

Therefore, it was an object of the present invention to provide a four-way conversion catalyst exhibiting improved particle filtration efficiency and, at the same time, no or only a moderate increase in back-pressure.

Surprisingly, it was found that a four-way catalyst for the treatment of an exhaust gas stream of a gasoline engine according to the present invention permits to improve particles filtration efficiency while exhibiting no or only a moderate increase in back-pressure.

Therefore, the present invention relates to a four-way conversion catalyst for the treatment of an exhaust gas stream of a gasoline engine, the catalyst comprising

- a porous wall flow filter substrate comprising an inlet end, an outlet end, a substrate axial length extending between the inlet end and the outlet end, and a plurality of passages defined by porous internal walls of the porous wall flow filter substrate, wherein the plurality of passages comprise inlet passages having an open inlet end and a closed outlet end, and outlet passages having a closed inlet end and an open outlet end;
- wherein in the pores of the porous internal walls and on the surface of the porous internal walls, which surface defines the interface between the porous internal walls and the passages, the catalyst comprises a three-way conversion catalytic coating comprising an oxygen storage compound and a platinum group metal supported on a refractory metal oxide;
- wherein in the pores of the porous internal walls, the three-way conversion catalytic coating is present as in-wall-coating and on the surface of the porous internal walls, the three-way conversion catalytic coating is present as on-wall-coating;
- wherein in addition to said three-way conversion catalytic coating, the catalyst comprises no further coating in the pores of the porous internal walls and no further coating on the surface of the porous internal walls.

In the context of the present invention, the term "the surface of the porous internal walls" is to be understood as the "naked" or "bare" or "blank" surface of the walls, i.e. the surface of the walls in an untreated state which consists—apart from any unavoidable impurities with which the surface may be contaminated—of the material of the walls.

In particular, the four-way conversion catalyst of the present invention is a fresh catalyst, i.e. a catalyst which had not been exposed to a treatment of an exhaust gas stream of a gasoline engine.

Preferably, the three-way conversion catalytic coating comprised in the four way conversion catalyst is present at a total loading, l(total), in the range of from 0.1 to 5 $g/in^3$, more preferably in the range of from 0.5 to 4 $g/in^3$, more preferably in the range of from 0.8 to 3 $g/in^3$, wherein the total loading is the sum of l(in-wall coating) and l(on-wall coating), wherein l(in-wall coating) is the loading of the in-wall coating and l(on-wall coating) is the loading of the on-wall coating.

Preferably, in the catalyst, the loading ratio, defined as the loading of the on-wall coating, l(on-wall coating), relative to the loading of the in-wall coating, l(in-wall coating), said loading ratio being defined as l(on-wall coating):l(in-wall coating), is in the range of from 1:99 to 50:50, more preferably in the range of from 2:98 to 35:65, more preferably in the range of from 5:95 to 20:80.

Preferably, from 95 to 100 weight-%, more preferably from 98 to 100 weight-%, more preferably from 99 to 100 weight-%, more preferably from 99.5 to 100 weight-%, more preferably from 99.9 to 100 weight-% of the four-way conversion catalyst consist of the porous wall flow filter substrate and the three-way conversion catalytic coating.

Preferably, the four-way conversion catalyst according to the present invention consists of the wall flow filter substrate and the three-way conversion catalytic coating.

It is preferred that the three-way conversion catalytic coating consists of the in-wall-coating and the on-wall coating.

Therefore, the present invention preferably relates to a four-way conversion catalyst for the treatment of an exhaust gas stream of a gasoline engine, the catalyst comprising

- a porous wall flow filter substrate comprising an inlet end, an outlet end, a substrate axial length extending between the inlet end and the outlet end, and a plurality of passages defined by porous internal walls of the porous wall flow filter substrate, wherein the plurality of passages comprise inlet passages having an open inlet end and a closed outlet end, and outlet passages having a closed inlet end and an open outlet end;
- wherein in the pores of the porous internal walls and on the surface of the porous internal walls, which surface defines the interface between the porous internal walls and the passages, the catalyst comprises a three-way conversion catalytic coating comprising an oxygen storage compound and a platinum group metal supported on a refractory metal oxide;
- wherein in the pores of the porous internal walls, the three-way conversion catalytic coating is present as in-wall-coating and on the surface of the porous internal walls, the three-way conversion catalytic coating is present as on-wall-coating;

wherein in addition to said three-way conversion catalytic coating, the catalyst comprises no further coating in the pores of the porous internal walls and no further coating on the surface of the porous internal walls, wherein the four-way conversion catalyst comprises the three-way conversion catalytic coating at a total loading, l(total), in the range of from 0.1 to 5 g/in$^3$, more preferably in the range of from 0.5 to 4 g/in$^3$, more preferably in the range of from 0.8 to 3 g/in$^3$, wherein the total loading is the sum of l(in-wall coating) and l(on-wall coating), wherein l(in-wall coating) is the loading of the in-wall coating and l(on-wall coating) is the loading of the on-wall coating, wherein in the catalyst, the loading ratio, defined as the loading of the on-wall coating, l(on-wall coating), relative to the loading of the in-wall coating, l(in-wall coating), said loading ratio being defined as l(on-wall coating):l(in-wall coating), is in the range of from 1:99 to 50:50, more preferably in the range of from 2:98 to 35:65, more preferably in the range of from 5:95 to 20:80, wherein from 95 to 100 weight-%, more preferably from 98 to 100 weight-%, more preferably from 99 to 100 weight-%, more preferably from 99.5 to 100 weight-%, more preferably from 99.9 to 100 weight-% of the four-way conversion catalyst consist of the porous wall flow filter substrate and the three-way conversion catalytic coating.

In the context of the present invention, the porous internal walls comprising the in-wall coating preferably have a relative average porosity in the range of from 20 to 99%, more preferably in the range of from 50 to 98%, more preferably in the range of from 75 to 97, wherein the relative average porosity is defined as the average porosity of the internal walls comprising the in-wall coating relative to the average porosity of the internal walls not comprising the in-wall coating, wherein the average porosity is determined according to Reference Example 3 herein. More preferably, the average porosity of the internal walls not comprising the in-wall coating is in the range of from 20 to 75%, more preferably in the range of from 30 to 70%, more preferably in the range of from 40 to 65%, wherein the average porosity is determined according to Reference Example 3 herein.

It is preferred that the porous internal walls comprising the in-wall coating have a relative average pores size in the range of from 10 to 21 micrometer, more preferably in the range of from 12 to 19.5 micrometer, more preferably in the range of from 14 to 18 micrometer, wherein the relative average pore size is defined as the average pore size of the internal walls comprising the in-wall coating relative to the average pore size of the internal walls not comprising the in-wall coating, wherein the average pore size is determined according to Reference Example 3 herein. More preferably, the average pore size of the internal walls not comprising the in-wall coating is in the range of from 9.5 to 21.5 micrometer, more preferably in the range of from 11.5 to 20 micrometer, more preferably in the range of from 13.5 to 18.5 micrometer, wherein the average pore size is determined according to Reference Example 3 herein.

According to the present invention, it is preferred that the wall flow filter substrate comprises the three-way conversion catalytic coating at an inlet coating length of x % of the substrate axial length, wherein $0 \leq x \leq 100$; and that the wall flow filter substrate comprises the three-way conversion catalytic coating at an outlet coating length of y % of the substrate axial length, wherein $0 \leq y \leq 100$; wherein $x+y>0$.

More preferably $0<x\leq100$, more preferably $50\leq x\leq100$, more preferably $75\leq x\leq100$, more preferably $90\leq x\leq100$, more preferably $95\leq x\leq100$, more preferably $99\leq x\leq100$, and $0\leq y\leq5$, more preferably $y=0$. Alternatively, more preferably $0<y\leq100$, more preferably $50\leq y\leq100$, more preferably $75\leq y\leq100$, more preferably $90\leq y\leq100$, more preferably $95\leq y\leq100$, more preferably $99\leq y\leq100$, and $0\leq x\leq5$, more preferably $x=0$. As a further alternative, more preferably, $0<x\leq100$, more preferably $10\leq x\leq90$, more preferably $20\leq x\leq80$, more preferably $30\leq x\leq70$, more preferably $40\leq x\leq60$, more preferably $45\leq x\leq55$, and $0<y\leq100$, more preferably $10\leq y\leq90$, more preferably $20\leq y\leq80$, more preferably $30\leq y\leq70$, more preferably $40\leq y\leq60$, more preferably $45\leq y\leq55$.

Therefore, the present invention preferably relates to a four-way conversion catalyst for the treatment of an exhaust gas stream of a gasoline engine, the catalyst comprising
  a porous wall flow filter substrate comprising an inlet end, an outlet end, a substrate axial length extending between the inlet end and the outlet end, and a plurality of passages defined by porous internal walls of the porous wall flow filter substrate, wherein the plurality of passages comprise inlet passages having an open inlet end and a closed outlet end, and outlet passages having a closed inlet end and an open outlet end;
  wherein in the pores of the porous internal walls and on the surface of the porous internal walls, which surface defines the interface between the porous internal walls and the passages, the catalyst comprises a three-way conversion catalytic coating comprising an oxygen storage compound and a platinum group metal supported on a refractory metal oxide;
  wherein in the pores of the porous internal walls, the three-way conversion catalytic coating is present as in-wall-coating and on the surface of the porous internal walls, the three-way conversion catalytic coating is present as on-wall-coating;
  wherein in addition to said three-way conversion catalytic coating, the catalyst comprises no further coating in the pores of the porous internal walls and no further coating on the surface of the porous internal walls,
  wherein the porous internal walls comprising the in-wall coating have a relative average porosity in the range of from 20 to 99%, more preferably in the range of from 50 to 98%, more preferably in the range of from 75 to 97, wherein the relative average porosity is defined as the average porosity of the internal walls comprising the in-wall coating relative to the average porosity of the internal walls not comprising the in-wall coating, wherein the average porosity is determined according to Reference Example 3 herein,
  wherein the porous internal walls comprising the in-wall coating have a relative average pore size in the range of from 10 to 21 micrometer, more preferably in the range of from 12 to 19.5 micrometer, more preferably in the range of from 14 to 18 micrometer, wherein the relative average pore size is defined as the average pore size of the internal walls comprising the in-wall coating relative to the average pore size of the internal walls not comprising the in-wall coating, wherein the average pore size is determined according to Reference Example 3 herein,
  wherein the wall flow filter substrate comprises the three-way conversion catalytic coating at an inlet coating length of x % of the substrate axial length, wherein $0\leq x\leq100$; and the wall flow filter substrate comprises the three-way conversion catalytic coating at an outlet coating length of y % of the substrate axial length, wherein 0≤y≤100; wherein x+y>0.

With regard to the material of the wall-flow substrate, no specific restrictions exist, provided that the material is suitable for the intended use of the catalyst. Preferably, the wall-flow substrate comprises, more preferably consists of, a cordierite, a silicon carbide, or an aluminum titanate.

Preferably, the three-way conversion catalytic coating comprises a hydrocarbon (HC) oxidation component, a carbon monoxide (CO) oxidation component, and a nitrogen oxide (NOx) reduction component.

It is preferred that the three-way conversion catalytic coating comprises one or more platinum group metals, more preferably one or more of ruthenium, palladium, rhodium, platinum, and iridium, more preferably one or more of palladium, rhodium, and platinum, more preferably one or more of palladium and rhodium, more preferably palladium and rhodium.

Preferably, the three-way conversion catalytic in-wall coating comprises an oxygen storage compound.

More preferably, the oxygen storage compound comprises cerium, more preferably comprises one or more of a cerium oxide, a mixture of oxides comprising a cerium oxide, and a mixed oxide comprising cerium, wherein the mixed oxide comprising cerium preferably additionally comprises one or more of zirconium, yttrium, neodynium, lanthanum, and praseodymium, more preferably additionally comprises one or more of zirconium, yttrium, neodynium, and lanthanum, more preferably additionally comprises zirconium, yttrium, neodynium, and lanthanum. Further, the oxygen storage compound comprising cerium may consist of two or more different mixed oxides wherein each one of these mixed oxides may comprise cerium and one or more of zirconium, yttrium, neodynium, lanthanum, and praseodymium.

More preferably, the oxygen storage compound has a porosity in the range of from 0.05 to 1.5 ml/g, more preferably in the range of from 0.1 to 1.0 ml/g, more preferably in the range of from 0.15 to 0.8 ml/g, wherein the porosity is determined according to Reference Example 1 herein.

It is preferred that the three-way conversion catalytic coating comprises a refractory metal oxide support.

More preferably, the refractory metal oxide support comprises aluminum, more preferably comprises one or more of an aluminum oxide, a mixture of oxides comprising an aluminum oxide, and a mixed oxide comprising aluminum, wherein the mixed oxide comprising aluminum more preferably additionally comprises one or more of zirconium, cerium, lanthanum, barium, and neodymium, wherein more preferably, the refractory metal oxide support comprises an aluminum oxide, more preferably a gamma aluminum oxide.

More preferably, the refractory metal oxide support has a porosity in the range of from 0.05 to 1.5 ml/g, more preferably in the range of from 0.1 to 1.0 ml/g, more preferably in the range of from 0.15 to 0.8 ml/g, wherein the porosity is determined according to Reference Example 1 herein.

Preferably, the three-way conversion catalytic coating comprises a promotor. The term "promotor" as used in the context of the present invention relates to a compound which promotes the overall catalytic activity. More preferably, the promotor comprises one or more of zirconium, a barium, strontium, lanthanum, neodymium, yttrium, and praseodymium, wherein more preferably, the promotor comprises one or more of zirconium and barium. More preferably, the promotor comprises, more preferably is, one or more of a mixture of barium oxide and strontium oxide and a mixed oxide of barium and strontium.

Therefore, the present invention preferably relates to a four-way conversion catalyst for the treatment of an exhaust gas stream of a gasoline engine, the catalyst comprising
  a porous wall flow filter substrate comprising an inlet end, an outlet end, a substrate axial length extending between the inlet end and the outlet end, and a plurality of passages defined by porous internal walls of the porous wall flow filter substrate, wherein the plurality of passages comprise inlet passages having an open inlet end and a closed outlet end, and outlet passages having a closed inlet end and an open outlet end;
  wherein in the pores of the porous internal walls and on the surface of the porous internal walls, which surface defines the interface between the porous internal walls and the passages, the catalyst comprises a three-way conversion catalytic coating comprising an oxygen storage compound and a platinum group metal supported on a refractory metal oxide;
  wherein in the pores of the porous internal walls, the three-way conversion catalytic coating is present as in-wall-coating and on the surface of the porous internal walls, the three-way conversion catalytic coating is present as on-wall-coating;
  wherein in addition to said three-way conversion catalytic coating, the catalyst comprises no further coating in the pores of the porous internal walls and no further coating on the surface of the porous internal walls,
  wherein the three-way conversion catalytic coating comprises one or more platinum group metals, more preferably one or more of ruthenium, palladium, rhodium, platinum, and iridium, more preferably one or more of palladium, rhodium, and platinum, more preferably one or more of palladium and rhodium, more preferably palladium and rhodium,
  wherein the three-way conversion catalytic in-wall coating comprises an oxygen storage compound, wherein more preferably the oxygen storage compound comprises cerium, more preferably comprises one or more of a cerium oxide, a mixture of oxides comprising a cerium oxide, and a mixed oxide comprising cerium, wherein the mixed oxide comprising cerium preferably additionally comprises one or more of zirconium, yttrium, neodynium, lanthanum, and praseodymium, more preferably additionally comprises one or more of zirconium, yttrium, neodynium, and lanthanum, more preferably additionally comprises zirconium, yttrium, neodynium, and lanthanum,
  wherein the three-way conversion catalytic coating comprises a refractory metal oxide support, wherein more preferably the refractory metal oxide support comprising aluminum, more preferably comprises one or more of an aluminum oxide, a mixture a mixture of oxides comprising an aluminum oxide, and a mixed oxide comprising aluminum, wherein the mixed oxide comprising aluminum more preferably additionally comprises one or more of zirconium, cerium, lanthanum, barium, and neodymium, wherein more preferably, the refractory metal oxide support comprises an aluminum oxide, more preferably a gamma aluminum oxide,
  wherein the three-way conversion catalytic coating comprises a promotor,
  more preferably wherein the porous internal walls comprising the in-wall coating have a relative average porosity in the range of from 20 to 99%, more preferably in the range of from 50 to 98%, more preferably in the range of from 75 to 97, wherein the relative average porosity is defined as the average porosity of the internal walls comprising the in-wall coating relative to the average porosity of the internal walls not comprising the in-wall coating, wherein the average porosity is determined according to Reference Example 3 herein, more preferably wherein the porous internal walls comprising the in-wall coating have a relative average pores size in the range of from 10 to 21 micrometer, more preferably in the range of from 12 to 19.5 micrometer, more preferably in the range of from 14 to 18 micrometer, wherein the relative average pore size is defined as the average pore size of the internal walls comprising the in-wall coating relative to the average pore size of the internal walls not comprising the in-wall coating, wherein the average pore size is determined according to Reference Example 3 herein.

Preferably, the three-way conversion catalytic coating comprises a platinum group metal, more preferably rhodium, supported on a refractory metal oxide support as defined above; a platinum group metal, more preferably palladium, supported on an oxygen storage compound as defined above, and a promotor as defined above.

It is preferred that from 95 to 100 weight-%, more preferably from 98 to 100 weight-%, more preferably from 99 to 100 weight-%, more preferably from 99.5 to 100 weight-%, more preferably from 99.9 to 100 weight-% of the three-way conversion catalytic coating consist of a platinum group metal, preferably rhodium, supported on a refractory metal oxide support as defined above; a platinum group metal, preferably palladium, supported on an oxygen storage compound as defined above; and a promotor as defined above.

More preferably, the three-way conversion catalytic coating comprises the platinum group metal supported on the refractory metal oxide support at a loading in the range of from 1 to 200 g/ft$^3$, more preferably in the range of from 3 to 180 g/ft$^3$, more preferably in the range of from 4 to 150 g/ft$^3$ and said refractory metal oxide support at a loading in the range of from 0.1 to 3 g/in$^3$, more preferably in the range of from 0.15 to 2.5 g/in$^3$, more preferably in the range of from 0.2 to 2 g/in$^3$; wherein the three-way conversion catalytic coating further comprises the platinum group metal supported on the oxygen storage compound at a loading in the range of from 1 to 200 g/ft$^3$, more preferably in the range of from 3 to 180 g/ft$^3$, more preferably in the range of from 4 to 150 g/ft$^3$, and said oxygen storage compound at a loading in the range of from 0.1 to 3 g/in$^3$, more preferably in the range of from 0.15 to 2.5 g/in$^3$, more preferably in the range of from 0.2 to 2 g/in$^3$; wherein the three-way conversion catalytic coating further comprises the promotor at a loading in the range of from 0.001 to 1.0 g/in$^3$, more preferably in the range of from 0.005 to 0.5 g/in$^3$, more preferably in the range of from 0.005 to 0.2 g/in$^3$.

According to the present invention, it is preferred that the four-way conversion catalyst is comprised in an exhaust gas treatment system downstream of and in fluid communication with a gasoline engine.

The present invention further relates to a process for preparing the four-way conversion catalyst as described above, said process comprises (i) providing a porous wall flow filter substrate comprising an inlet end, an outlet end, a substrate axial length extending between the inlet end and the outlet end, and a plurality of passages defined by porous internal walls of the porous wall flow filter substrate, wherein the plurality of passages comprise inlet passages having an open inlet end and a closed outlet end, and outlet passages having a closed inlet end and an open outlet end, wherein the internal walls have an average pore size in the range of from 9 to 22 micrometer, wherein the average pore size is determined according to Reference Example 3 herein, and wherein the average porosity of the internal walls of the internal walls is in the range of from 20 to 75%, wherein the average porosity is determined according to Reference Example 3 herein;

(ii) providing a washcoat slurry comprising particles of a source of the three-way conversion catalytic coating, said particles having a volume based particle size distribution Dv90 in the range of from 11 to 21 micrometer, wherein the volume based particle size distribution Dv90 is determined as described in Reference Example 4;

(iii) coating the porous internal walls of the porous wall flow filter substrate provided in (i) with the particles of the washcoat slurry provided in (ii).

Preferably, the internal walls according to (i) have an average pore size in the range of from 11 to 20.5 micrometer, more preferably in the range of from 13 to 19 micrometer, wherein the average pore size is determined according to Reference Example 3 herein.

Preferably, the average porosity of the internal walls according to (i) is in the range of from 30 to 70%, more preferably in the range of from 40 to 65%, wherein the average porosity is determined according to Reference Example 3 herein.

It is preferred that the particles according to (ii) have a volume based particle size distribution Dv90 in the range of from 11.5 to 17.5 micrometer, more preferably in the range of from 12 to 13 micrometer, wherein the volume based particle size distribution Dv90 is determined as described in Reference Example 4.

Preferably, the washcoat slurry provided in (ii) has a viscosity in the range of from 5 to 35 mPa·s at a shear rate of 300 s$^{-1}$ determined as described in Reference Example 5. This viscosity is the viscosity of the slurry after its preparation. Before the slurry is applied, it may conceivable to adjust the slurry solid dry mass to the applied washcoat loading, for example by respectively diluting with deionized water. For example, it may be conceivable to adjust the viscosity to a value of at most 7 mPa·s for a desired washcoat loading in the range of from 50 to 60 g/l or to a value of at most 10 mPa·s for a desired washcoat loading in the range of from 60 to 75 g/l or to a value of at most 13 mPa·s for a desired washcoat loading in the range of from 75 to 90 g/l or to a value of at most 25 mPa·s for a desired washcoat loading of more than 90 g/l.

Regarding (ii) of said process, it is preferred that providing the washcoat slurry according to (ii) comprises (ii.1) impregnating a source of a platinum group metal onto a refractory metal oxide support; admixing the platinum group metal supported on the refractory metal oxide with one or more of an adjuvant and a source of a promotor, obtaining a slurry comprising particles of a source of the three-way conversion catalytic coating, said particles having a volume based particle size distribution Dv90 of more than 21 micrometer, wherein the volume based particle size distribution Dv90 is determined as described in Reference Example 4; and milling said slurry obtaining a slurry wherein the particles comprised in said slurry have a volume based particle size distribution Dv90 in the range of from 11 to 21 micrometer, more preferably in the range of from 11.5 to 17.5 micrometer, more preferably in the range of from 12 to 13 micrometer;

(ii.2) impregnating a source of a platinum group metal onto an oxygen storage compound; admixing the platinum group metal supported on the oxygen storage compound with one or more of an adjuvant and a source of a promotor, obtaining a slurry comprising particles of a source of the three-way conversion catalytic coating, said particles having a volume based particle size distribution Dv90 in the range of from 11 to 21 micrometer, more preferably in the range of from 11.5 to 17.5 micrometer, more preferably in the range of from 12 to 13 micrometer, wherein the volume based particle size distribution Dv90 is determined as described in Reference Example 4; and milling said slurry obtaining a slurry wherein the particles comprised in said slurry have a volume based particle size distribution Dv90 in the range of from 11 to 21 micrometer, more preferably in the range of from 11.5 to 17.5 micrometer, more preferably in the range of from 12 to 13 micrometer;

(ii.3) admixing the slurry obtained from (ii.1) and the slurry obtained from (ii.2), obtaining the washcoat slurry comprising a source of the three-way conversion catalytic coating.

Preferably, milling said slurry according to (ii.1) comprises, more preferably consists of, milling from 40 to 60 weight-%, more preferably from 45 to 55 weight-% of said slurry obtaining a first slurry wherein the particles comprised in the first slurry have a volume based particle size distribution Dv90 in the range of from 16 to 21 micrometer, more preferably in the range of from 17 to 21 micrometer, more preferably in the range of from 18 to 21 micrometer, milling the remaining portion of said slurry obtaining a second slurry wherein the particles comprised in the second slurry have a volume based particle size distribution Dv90 in the range of from 4 to 8 micrometer, more preferably in the range of from 4.5 to 7 micrometer, more preferably in the range of from 5 to 6 micrometer, and combining said first slurry and said second slurry.

Preferably, milling said slurry according to (ii.2) comprises, more preferably consists of, milling from 40 to 60 weight-%, more preferably from 45 to 55 weight-% of said slurry obtaining a first slurry wherein the particles comprised in the first slurry have a volume based particle size distribution Dv90 in the range of from 16 to 21 micrometer, more preferably in the range of from 17 to 21 micrometer, more preferably in the range of from 18 to 21 micrometer, milling the remaining portion of said slurry obtaining a second slurry wherein the particles comprised in the second slurry have a volume based particle size distribution Dv90 in the range of from 4 to 8 micrometer, more preferably in the range of from 4.5 to 7 micrometer, more preferably in the range of from 5 to 6 micrometer, and combining said first slurry and said second slurry.

According to (ii.1), the platinum group metal is preferably one or more of ruthenium, palladium, rhodium, platinum, and iridium, more preferably one or more of palladium, rhodium, and platinum, more preferably one or more of palladium and rhodium, more preferably rhodium, wherein the source of a platinum group metal more preferably comprises a salt of a platinum group metal, more preferably comprises a nitrate of a platinum group metal.

According to (ii.1), it is preferred that the refractory metal oxide support comprises aluminum, more preferably comprises one or more of an aluminum oxide, a mixture of oxides comprising an aluminum oxide, and a mixed oxide comprising aluminum, wherein the mixed oxide comprising aluminum more preferably additionally comprises one or more of zirconium, cerium, lanthanum, barium, and neodymium, wherein more preferably, the refractory metal oxide support comprises an aluminum oxide, more preferably a gamma aluminum oxide, wherein the refractory metal oxide support has a porosity preferably in the range of from 0.05 to 1.5 ml/g, more preferably in the range of from 0.1 to 1.0 ml/g, more preferably in the range of from 0.15 to 0.8 ml/g, wherein the porosity is determined according to Reference Example 1 herein.

According to (ii.1) and prior to admixing the platinum group metal supported on the refractory metal oxide with one or more of an adjuvant and a source of a promotor, the refractory metal oxide source impregnated with the source of a platinum group metal is preferably calcined in a gas atmosphere, more preferably at a temperature of the gas atmosphere in the range of from 300 to 590° C., more preferably in the range of from 300 to 570° C., more preferably in the range of from 300 to 550° C., the gas atmosphere more preferably comprising oxygen.

According to (ii.1), it is preferred that the adjuvant is one or more of water, a polyacrylate, a methylcellulose, and an alcohol.

It is preferred that, according to (ii.1), the source of a promotor is a source of one or more of a promotor comprising zirconium, a promotor comprising barium, a promotor comprising strontium, a promotor comprising lanthanum, a promotor comprising neodymium, a promotor comprising yttrium, a promotor comprising praseodymium, more preferably one or more of a promotor comprising zirconium and a promotor comprising barium, more preferably a promotor comprising zirconium and a promotor comprising barium. More preferably, according to (ii.1), the source of a promotor comprises a salt, more preferably a nitrate, of the respective promotor element, more preferably zirconium nitrate and barium nitrate.

According to (ii.2), it is preferred that the platinum group metal is one or more of ruthenium, palladium, rhodium, platinum, and iridium, more preferably one or more of palladium, rhodium, and platinum, more preferably one or more of palladium and rhodium, more preferably palladium, wherein the source of a platinum group metal more preferably comprises a salt of a platinum group metal, more preferably comprises a nitrate of a platinum group metal.

According to (ii.2), the oxygen storage compound preferably comprises cerium, more preferably comprises one or more of a cerium oxide, a mixture of oxides comprising a cerium oxide, and a mixed oxide comprising cerium, wherein the mixed oxide comprising cerium more preferably additionally comprises one or more of zirconium, yttrium, neodynium, lanthanum, and praseodymium, more preferably additionally comprises one or more of zirconium, yttrium, neodynium, and lanthanum, more preferably additionally comprises zirconium, yttrium, neodynium, and lanthanum, wherein the oxygen storage compound has a porosity more preferably in the range of from 0.05 to 1.5 ml/g, more preferably in the range of from 0.1 to 1.0 ml/g, more preferably in the range of from 0.15 to 0.8 ml/g, wherein the porosity is determined according to Reference Example 1 herein. Further, the oxygen storage compound comprising cerium may consist of two or more different mixed oxides wherein each one of these mixed oxides may comprise cerium and one or more of zirconium, yttrium, neodynium, lanthanum, and praseodymium.

According to (ii.2) and prior to admixing the platinum group metal supported on the oxygen storage compound with one or more of an adjuvant and a source of a promotor, it is preferred that the oxygen storage compound impregnated with the source of a platinum group metal is calcined in a gas atmosphere, more preferably at a temperature of the gas atmosphere in the range of from 300 to 590° C., more preferably in the range of from 300 to 450° C., the gas atmosphere preferably comprising oxygen.

According to (ii.2), the adjuvant is preferably one or more of water, a polyacrylate, a methylcellulose, and an alcohol, more preferably octanol.

According to (ii.2), it is preferred that the source of a promotor is a source of one or more of a promotor comprising zirconium, a promotor comprising barium, a promotor comprising strontium, a promotor comprising lanthanum, a promotor comprising neodymium, a promotor comprising yttrium, a promotor comprising praseodymium, more preferably one or more of a promotor comprising zirconium and a promotor comprising barium, more preferably a promotor comprising zirconium and a promotor comprising barium.

Preferably, according to (ii.2), the source of a promotor comprises a salt, more preferably a nitrate, of the respective promotor element, more preferably zirconium nitrate and barium nitrate.

Preferably, according to (i), the porous wall-flow substrate comprises, more preferably consists of, a cordierite, a silicon carbide, or an aluminum titanate.

According to (iii), coating the porous internal walls of the porous wall flow filter substrate provided in (i) with the particles of the washcoat slurry provided in (ii) preferably comprises immersing the porous wall flow filter substrate into the washcoat slurry, exposing the porous wall flow filter substrate to the washcoat slurry for a period of time, more preferably in the range of from 0.5 to 10 s, more preferably in the range of from 1 to 6 s, and removing the porous wall flow filter substrate from the washcoat slurry.

More preferably, the inlet passages of the porous wall flow filter substrate are exposed to the washcoat slurry and the outlet passages of the porous wall flow filter substrate are not exposed to the washcoat slurry, wherein the inlet passages are exposed to the washcoat slurry over x % of the substrate axial length, wherein $0<x\leq100$, more preferably $50\leq x\leq100$, more preferably $75\leq x\leq100$, more preferably $90\leq x\leq100$, more preferably $95\leq x\leq100$, more preferably $99\leq x\leq100$. Alternatively, more preferably, the outlet passages of the porous wall flow filter substrate are exposed to the washcoat slurry and the inlet passages of the porous wall flow filter substrate are not exposed to the washcoat slurry, wherein the outlet passages are exposed to the washcoat slurry over y % of the substrate axial length, wherein $0<y\leq100$, more preferably $50\leq y\leq100$, more preferably $75\leq y\leq100$, more preferably $90\leq y\leq100$, more preferably $95\leq y\leq100$, more preferably $99\leq y\leq100$. As a further alternative, the inlet passages and the outlet passages of the porous wall flow filter substrate are more preferably exposed to the washcoat slurry, wherein the inlet passages are exposed to the washcoat slurry over x % of the substrate axial length, wherein $0<x\leq100$, more preferably $10\leq x\leq90$, more preferably $20\leq x\leq80$, more preferably $30\leq x\leq70$, more preferably $40\leq x\leq60$, more preferably $45\leq x\leq55$, wherein the outlet passages are exposed to the washcoat slurry over y % of the substrate axial length, wherein $0<y\leq100$, more preferably $10\leq y\leq90$, more preferably $20\leq y\leq80$, more preferably $30\leq y\leq70$, more preferably $40\leq y\leq60$, more preferably $45\leq y\leq55$.

According to (iii), it is preferred that the porous wall flow filter substrate removed from the washcoat slurry is subjected to calcination in a gas atmosphere, more preferably at a temperature of the gas atmosphere in the range of from 300 to 590° C., more preferably in the range of from 400 to 590° C., more preferably in the range of from 450 to 590° C., the gas atmosphere preferably comprising oxygen.

Therefore, the present invention preferably relates to a process for preparing the four-way conversion catalyst as described above, said process comprises (i) providing a porous wall flow filter substrate comprising an inlet end, an outlet end, a substrate axial length extending between the inlet end and the outlet end, and a plurality of passages defined by porous internal walls of the porous wall flow filter substrate, wherein the plurality of passages comprise inlet passages having an open inlet end and a closed outlet end, and outlet passages having a closed inlet end and an open outlet end, wherein the internal walls have an average pore size in the range of from 9 to 22 micrometer, wherein the average pore size is determined according to Reference Example 3 herein, and wherein the average porosity of the internal walls of the internal walls is in the range of from 20 to 75%, wherein the average porosity is determined according to Reference Example 3 herein;

(ii) providing a washcoat slurry comprising particles of a source of the three-way conversion catalytic coating, said particles having a volume based particle size distribution Dv90 in the range of from 11 to 21 micrometer, wherein the volume based particle size distribution Dv90 is determined as described in Reference Example 4, wherein (ii) comprises (ii.1) impregnating a source of a platinum group metal onto a refractory metal oxide support;
admixing the platinum group metal supported on the refractory metal oxide with one or more of an adjuvant and a source of a promotor, obtaining a slurry comprising particles of a source of the three-way conversion catalytic coating, said particles having a volume based particle size distribution Dv90 of more than 21 micrometer, wherein the volume based particle size distribution Dv90 is determined as described in Reference Example 4; and
milling said slurry obtaining a slurry wherein the particles comprised in said slurry have a volume based particle size distribution Dv90 in the range of from 11 to 21 micrometer, more preferably in the range of from 11.5 to 17.5 micrometer, more preferably in the range of from 12 to 13 micrometer;

(ii.2) impregnating a source of a platinum group metal onto an oxygen storage compound;
admixing the platinum group metal supported on the oxygen storage compound with one or more of an adjuvant and a source of a promotor, obtaining a slurry comprising particles of a source of the three-way conversion catalytic coating, said particles having a volume based particle size distribution Dv90 in the range of from 11 to 21 micrometer, more preferably in the range of from 11.5 to 17.5 micrometer, more preferably in the range of from 12 to 13 micrometer, wherein the volume based particle size distribution Dv90 is determined as described in Reference Example 4; and
milling said slurry obtaining a slurry wherein the particles comprised in said slurry have a volume based particle size distribution Dv90 in the range of from 11 to 21 micrometer, more preferably in the range of from 11.5 to 17.5 micrometer, more preferably in the range of from 12 to 13 micrometer;

(ii.3) admixing the slurry obtained from (ii.1) and the slurry obtained from (ii.2), obtaining the washcoat slurry comprising a source of the three-way conversion catalytic coating;

(iii) coating the porous internal walls of the porous wall flow filter substrate provided in (i) with the particles of the washcoat slurry provided in (ii), wherein more preferably coating the porous internal walls of the porous wall flow filter substrate provided in (i) with the particles of the washcoat slurry provided in (ii) comprises immersing the porous wall flow filter substrate into the washcoat slurry, exposing the porous wall flow filter substrate to the washcoat slurry for a period of time, more preferably in the range of from 0.5 to 10 s, more preferably in the range of from 1 to 6 s, and removing the porous wall flow filter substrate from the washcoat slurry, wherein more preferably the inlet passages of the porous wall flow filter substrate are exposed to the washcoat slurry and the outlet passages of the porous wall flow filter substrate are not exposed to the washcoat slurry, wherein the inlet passages are exposed to the washcoat slurry over x % of the substrate axial length, wherein $0 \leq x \leq 100$, more preferably $50 \leq x \leq 100$, more preferably $75 \leq x \leq 100$, more preferably $90 \leq x \leq 100$, more preferably $95 \leq x \leq 100$, more preferably $99 \leq x \leq 100$; or wherein more preferably the outlet passages of the porous wall flow filter substrate are exposed to the washcoat slurry and the inlet passages of the porous wall flow filter substrate are not exposed to the washcoat slurry, wherein the outlet passages are exposed to the washcoat slurry over y % of the substrate axial length, wherein $0 < y \leq 100$, more preferably $50 \leq y \leq 100$, more preferably $75 \leq y \leq 100$, more preferably $90 \leq y \leq 100$, more preferably $95 \leq y \leq 100$, more preferably $99 \leq y \leq 100$; or wherein more preferably the inlet passages and the outlet passages of the porous wall flow filter substrate are exposed to the washcoat slurry, wherein the inlet passages are exposed to the washcoat slurry over x % of the substrate axial length, wherein $0 < x \leq 100$, more preferably $10 \leq x \leq 90$, more preferably $20 \leq x \leq 80$, more preferably $30 \leq x \leq 70$, more preferably $40 \leq x \leq 60$, more preferably $45 \leq x \leq 55$, wherein the outlet passages are exposed to the washcoat slurry over y % of the substrate axial length, wherein $0 < y \leq 100$, more preferably $10 \leq y \leq 90$, more preferably $20 \leq y \leq 80$, more preferably $30 \leq y \leq 70$, more preferably $40 \leq y \leq 60$, more preferably $45 \leq y \leq 55$.

The present invention further relates to a four-way conversion catalyst, preferably the four-way conversion catalyst according to the present invention and as described above, obtainable or obtained or preparable or prepared by a process according to the present invention and as described above. It is more preferred that said four-way conversion catalyst is obtainable or obtained or preparable or prepared by a process according to the present invention, wherein said process consists of (i), (ii) and (iii).

The present invention further relates to an exhaust gas treatment system downstream of and in fluid communication with a gasoline engine, the system comprising a four-way conversion catalyst according to the present invention. Preferably, the gasoline engine is a gasoline direct injection engine. Preferably, the exhaust gas stream of the gasoline engine comprises hydrocarbon (HC), carbon monoxide (CO), nitrogen oxides (NOx), and particulates. More preferably, the gasoline engine is a gasoline direct injection engine and the exhaust gas stream of the gasoline engine comprises hydrocarbon (HC), carbon monoxide (CO), nitrogen oxides (NOx), and particulates.

The present invention further relates to a use of a four-way conversion catalyst according to the present invention, for the treatment of an exhaust gas stream from a gasoline engine. Preferably, the gasoline engine is a gasoline direct injection engine. Preferably, the exhaust gas stream of the gasoline engine comprises hydrocarbon (HC), carbon monoxide (CO), nitrogen oxides (NOx), and particulates. More preferably, the gasoline engine is a gasoline direct injection engine and the exhaust gas stream of the gasoline engine comprises hydrocarbon (HC), carbon monoxide (CO), nitrogen oxides (NOx), and particulates.

The present invention further relates to a method of treating an exhaust gas stream from a gasoline engine, comprising passing said exhaust gas stream through a four-way conversion catalyst according to the present invention. Preferably, the gasoline engine is a gasoline direct injection engine. Preferably, the exhaust gas stream of the gasoline engine comprises hydrocarbon (HC), carbon monoxide (CO), nitrogen oxides (NOx), and particulates. More preferably, the gasoline engine is a gasoline direct injection engine and the exhaust gas stream of the gasoline engine comprises hydrocarbon (HC), carbon monoxide (CO), nitrogen oxides (NOx), and particulates.

The present invention is further illustrated by the following set of embodiments and combinations of embodiments resulting from the dependencies and back-references as indicated. In particular, it is noted that in each instance where a range of embodiments is mentioned, for example in the context of a term such as "The four-way conversion catalyst of any one of embodiments 1 to 4", every embodiment in this range is meant to be explicitly disclosed for the skilled person, i.e. the wording of this term is to be understood by the skilled person as being synonymous to "The four-way conversion catalyst of any one of embodiments 1, 2, 3, and 4".

1. A four-way conversion catalyst for the treatment of an exhaust gas stream of a gasoline engine, the catalyst comprising
   a porous wall flow filter substrate comprising an inlet end, an outlet end, a substrate axial length extending between the inlet end and the outlet end, and a plurality of passages defined by porous internal walls of the porous wall flow filter substrate, wherein the plurality of passages comprise inlet passages having an open inlet end and a closed outlet end, and outlet passages having a closed inlet end and an open outlet end;
   wherein in the pores of the porous internal walls and on the surface of the porous internal walls, which surface defines the interface between the porous internal walls and the passages, the catalyst comprises a three-way conversion catalytic coating comprising an oxygen storage compound and a platinum group metal supported on a refractory metal oxide;
   wherein in the pores of the porous internal walls, the three-way conversion catalytic coating is present as in-wall-coating and on the surface of the porous internal walls, the three-way conversion catalytic coating is present as on-wall-coating;

wherein in addition to said three-way conversion catalytic coating, the catalyst comprises no further coating in the pores of the porous internal walls and no further coating on the surface of the porous internal walls.

2. The four-way conversion catalyst of embodiment 1, comprising the three-way conversion catalytic coating at a total loading, l(total), in the range of from 0.1 to 5 g/in³, preferably in the range of from 0.5 to 4 g/in³, more preferably in the range of from 0.8 to 3 g/in³, wherein the total loading is the sum of l(in-wall coating) and l(on-wall coating), wherein l(in-wall coating) is the loading of the in-wall coating and l(on-wall coating) is the loading of the on-wall coating.

3. The four-way conversion catalyst of embodiment 1 or 2, wherein in the catalyst, the loading ratio, defined as the loading of the on-wall coating, l(on-wall coating), relative to the loading of the in-wall coating, l(in-wall coating), said loading ratio being defined as l(on-wall coating):l(in-wall coating), is in the range of from 1:99 to 50:50, preferably in the range of from 2:98 to 35:65, more preferably in the range of from 5:95 to 20:80.

4. The four-way conversion catalyst of any one of embodiments 1 to 3, wherein from 95 to 100 weight-%, preferably from 98 to 100 weight-%, more preferably from 99 to 100 weight-%, more preferably from 99.5 to 100 weight-%, more preferably from 99.9 to 100 weight-% of the four-way conversion catalyst consist of the porous wall flow filter substrate and the three-way conversion catalytic coating.

5. The four-way conversion catalyst of any one of embodiments 1 to 4, consisting of the wall flow filter substrate and the three-way conversion catalytic coating.

6. The four-way conversion catalyst of any one of embodiments 1 to 5, wherein the three-way conversion catalytic coating consists of the in-wall-coating and the on-wall coating.

7. The four-way conversion catalyst of any one of embodiments 1 to 6, wherein the porous internal walls comprising the in-wall coating have a relative average porosity in the range of from 20 to 99%, preferably in the range of from 50 to 98%, more preferably in the range of from 75 to 97%, wherein the relative average porosity is defined as the average porosity of the internal walls comprising the in-wall coating relative to the average porosity of the internal walls not comprising the in-wall coating, wherein the average porosity is determined according to Reference Example 3 herein.

8. The four-way conversion catalyst of embodiment 7, wherein the average porosity of the internal walls not comprising the in-wall coating is in the range of from 20 to 75%, preferably in the range of from 30 to 70%, more preferably in the range of from 40 to 65%, wherein the average porosity is determined according to Reference Example 3 herein.

9. The four-way conversion catalyst of any one of embodiments 1 to 8, wherein the porous internal walls comprising the in-wall coating have a relative average pores size in the range of from 10 to 21 micrometer, preferably in the range of from 12 to 19.5 micrometer, more preferably in the range of from 14 to 18 micrometer, wherein the relative average pore size is defined as the average pore size of the internal walls comprising the in-wall coating relative to the average pore size of the internal walls not comprising the in-wall coating, wherein the average pore size is determined according to Reference Example 3 herein.

10. The four-way conversion catalyst of embodiment 9, wherein the average pore size of the internal walls not comprising the in-wall coating is in the range of from 9.5 to 21.5 micrometer, preferably in the range of from 11.5 to 20 micrometer, more preferably in the range of from 13.5 to 18.5 micrometer, wherein the average pore size is determined according to Reference Example 3 herein.

11. The four-way conversion catalyst of any one of embodiments 1 to 10, wherein the wall flow filter substrate comprises the three-way conversion catalytic coating at an inlet coating length of x % of the substrate axial length, wherein $0 \leq x \leq 100$; and wherein the wall flow filter substrate comprises the three-way conversion catalytic coating at an outlet coating length of y % of the substrate axial length, wherein $0 \leq y \leq 100$; wherein $x+y>0$.

12. The four-way conversion catalyst of embodiment 11, wherein $0<x \leq 100$, preferably $50 \leq x \leq 100$, more preferably $75 \leq x \leq 100$, more preferably $90 \leq x \leq 100$, more preferably $95 \leq x \leq 100$, more preferably $99 \leq x \leq 100$, and wherein $0 \leq y \leq 5$, preferably $y=0$.

13. The four-way conversion catalyst of embodiment 11, wherein $0<y \leq 100$, preferably $50 \leq y \leq 100$, more preferably $75 \leq y \leq 100$, more preferably $90 \leq y \leq 100$, more preferably $95 \leq y \leq 100$, more preferably $99 \leq y \leq 100$, and wherein $0 \leq x \leq 5$, preferably $x=0$.

14. The four-way conversion catalyst of embodiment 11, wherein $0<x \leq 100$, preferably $10 \leq x \leq 90$, more preferably $20 \leq x \leq 80$, more preferably $30 \leq x \leq 70$, more preferably $40 \leq x \leq 60$, more preferably $45 \leq x \leq 55$, and wherein $0<y \leq 100$, preferably $10 \leq y \leq 90$, more preferably $20 \leq y \leq 80$, more preferably $30 \leq y \leq 70$, more preferably $40 \leq y \leq 60$, more preferably $45 \leq y \leq 55$.

15. The four-way conversion catalyst of any one of embodiments 1 to 14, wherein the wall-flow substrate comprises, preferably consists of a cordierite, a silicon carbide, or an aluminum titanate.

16. The four-way conversion catalyst of any one of embodiments 1 to 15, wherein the three-way conversion catalytic coating comprises a hydrocarbon (HC) oxidation component, a carbon monoxide (CO) oxidation component, and a nitrogen oxide (NOx) reduction component.

17. The four-way conversion catalyst of any one of embodiments 1 to 16, wherein the three-way conversion catalytic coating comprises one or more platinum group metals, preferably one or more of ruthenium, palladium, rhodium, platinum, and iridium, more preferably one or more of palladium, rhodium, and platinum, more preferably one or more of palladium and rhodium, more preferably palladium and rhodium.

18. The four-way conversion catalyst of any one of embodiments 1 to 17, wherein the three-way conversion catalytic in-wall coating comprises an oxygen storage compound, wherein the oxygen storage compound preferably comprises cerium, more preferably comprises one or more of a cerium oxide, a mixture of oxides comprising a cerium oxide, and a mixed oxide comprising cerium, wherein the mixed oxide comprising cerium preferably additionally comprises one or more of zirconium, yttrium, neodynium, lanthanum, and praseodymium, more preferably additionally comprises one or more of zirconium, yttrium, neodynium, and lanthanum, more preferably additionally comprises zirconium, yttrium, neodynium, and lanthanum.

19. The four-way conversion catalyst of embodiment 18, wherein the oxygen storage compound has a porosity in the range of from 0.05 to 1.5 ml/g, preferably in the range of from 0.1 to 1.0 ml/g, more preferably in the range of from 0.15 to 0.8 ml/g, wherein the porosity is determined according to Reference Example 1 herein.

20. The four-way conversion catalyst of any one of embodiments 1 to 19, wherein the three-way conversion catalytic coating comprises a refractory metal oxide support, wherein the refractory metal oxide support comprising aluminum preferably comprises one or more of an aluminum oxide, a mixture a mixture of oxides comprising an aluminum oxide, and a mixed oxide comprising aluminum, wherein the mixed oxide comprising aluminum preferably additionally comprises one or more of zirconium, cerium, lanthanum, barium, and neodymium, wherein more preferably, the refractory metal oxide support comprises an aluminum oxide, more preferably a gamma aluminum oxide.

21. The four-way conversion catalyst of embodiment 20, wherein the refractory metal oxide support has a porosity in the range of from 0.05 to 1.5 ml/g, preferably in the range of from 0.1 to 1.0 ml/g, more preferably in the range of from 0.15 to 0.8 ml/g, wherein the porosity is determined according to Reference Example 1 herein.

22. The four-way conversion catalyst of any one of embodiments 1 to 21, wherein the three-way conversion catalytic coating comprises a promotor, wherein the promotor preferably comprises one or more of zirconium, a barium, strontium, lanthanum, neodymium, yttrium, and praseodymium, wherein more preferably, the promotor comprises one or more of zirconium and barium, wherein more preferably, the promotor comprises, more preferably is, one or more of a mixture of barium oxide and strontium oxide and a mixed oxide of barium and strontium.

23. The four-way conversion catalyst of any one of embodiments 1 to 22, wherein the three-way conversion catalytic coating comprises a platinum group metal, preferably rhodium, supported on a refractory metal oxide as defined in embodiment 20 or 21; a platinum group metal, preferably palladium, supported on an oxygen storage compound as defined in embodiment 18 or 19, and a promotor as defined in embodiment 22.

24. The four-way conversion catalyst of any one of embodiments 1 to 23, wherein from 95 to 100 weight-%, preferably from 98 to 100 weight-%, more preferably from 99 to 100 weight-%, more preferably from 99.5 to 100 weight-%, more preferably from 99.9 to 100 weight-% of the three-way conversion catalytic coating consist of a platinum group metal, preferably rhodium, supported on a refractory metal oxide as defined in embodiment 20 or 21; a platinum group metal, preferably palladium, supported on an oxygen storage compound as defined in embodiment 18 or 19; and a promotor as defined in embodiment 22.

25. The four-way conversion catalyst of embodiments 24, wherein the three-way conversion catalytic coating comprises the platinum group metal supported on the refractory metal oxide support at a loading in the range of from 1 to 200 g/ft$^3$, preferably in the range of from 3 to 180 g/ft$^3$, more preferably in the range of from 4 to 150 g/ft$^3$ and said refractory metal oxide support at a loading in the range of from 0.1 to 3 g/in$^3$, preferably in the range of from 0.15 to 2.5 g/in$^3$, more preferably in the range of from 0.2 to 2 g/in$^3$; wherein the three-way conversion catalytic coating further comprises the platinum group metal supported on the oxygen storage compound at a loading in the range of from 1 to 200 g/ft$^3$, preferably in the range of from 3 to 180 g/ft$^3$, more preferably in the range of from 4 to 150 g/ft$^3$, and said oxygen storage compound at a loading in the range of from 0.1 to 3 g/in$^3$, preferably in the range of from 0.15 to 2.5 g/in$^3$, more preferably in the range of from 0.2 to 2 g/in$^3$; wherein the three-way conversion catalytic coating further comprises the promotor at a loading in the range of from 0.001 to 1.0 g/in$^3$, preferably in the range of from 0.005 to 0.5 g/in$^3$, more preferably in the range of from 0.005 to 0.2 g/in$^3$.

26. The four-way conversion catalyst of any one of embodiments 1 to 25, comprised in an exhaust gas treatment system downstream of and in fluid communication with a gasoline engine.

27. A process for preparing the four-way conversion catalyst of any one of embodiments 1 to 26, comprising
   (i) providing a porous wall flow filter substrate comprising an inlet end, an outlet end, a substrate axial length extending between the inlet end and the outlet end, and a plurality of passages defined by porous internal walls of the porous wall flow filter substrate, wherein the plurality of passages comprise inlet passages having an open inlet end and a closed outlet end, and outlet passages having a closed inlet end and an open outlet end, wherein the internal walls have an average pore size in the range of from 9 to 22 micrometer, wherein the average pore size is determined according to Reference Example 3 herein, and wherein the average porosity of the internal walls of the internal walls is in the range of from 20 to 75%, wherein the average porosity is determined according to Reference Example 3 herein;
   (ii) providing a washcoat slurry comprising particles of a source of the three-way conversion catalytic coating, said particles having a volume based particle size distribution Dv90 in the range of from 11 to 21 micrometer, wherein the volume based particle size distribution Dv90 is determined as described in Reference Example 4;
   (iii) coating the porous internal walls of the porous wall flow filter substrate provided in (i) with the particles of the washcoat slurry provided in (ii).

28. The process of embodiment 27, wherein the internal walls according to (i) have an average pore size in the range of from 11 to 20.5 micrometer, preferably in the range of from 13 to 19 micrometer, wherein the average pore size is determined according to Reference Example 3 herein.

29. The process of embodiment 27 or 28, wherein the average porosity of the internal walls according to (i) is in the range of from 30 to 70%, preferably in the range of from 40 to 65%, wherein the average porosity is determined according to Reference Example 3 herein.

30. The process of any one of embodiments 27 to 29, wherein the particles according to (ii) have a volume based particle size distribution Dv90 in the range of from 11.5 to 17.5 micrometer, preferably in the range of from 12 to 13 micrometer, wherein the volume based particle size distribution Dv90 is determined as described in Reference Example 4.

31. The process of any one embodiments 27 to 30, wherein the washcoat slurry provided in (ii) has a viscosity in the range of from 5 to 35 mPa·s at a shear rate of 300 s$^{-1}$ as described in Reference Example 5.

32. The process of any one of embodiments 27 to 31, wherein providing the washcoat slurry according to (ii) comprises
    (ii.1) impregnating a source of a platinum group metal onto a refractory metal oxide support;
        admixing the platinum group metal supported on the refractory metal oxide with one or more of an adjuvant and a source of a promotor, obtaining a slurry comprising particles of a source of the three-way conversion catalytic coating, said particles having a volume based particle size distribution Dv90 of more than 21 micrometer, wherein the volume based particle size distribution Dv90 is determined as described in Reference Example 4; and
        milling said slurry obtaining a slurry wherein the particles comprised in said slurry have a volume based particle size distribution Dv90 in the range of from 11 to 21 micrometer, preferably in the range of from 11.5 to 17.5 micrometer, more preferably in the range of from 12 to 13 micrometer;
    (ii.2) impregnating a source of a platinum group metal onto an oxygen storage compound;
        admixing the platinum group metal supported on the oxygen storage compound with one or more of an adjuvant and a source of a promotor, obtaining a slurry comprising particles of a source of the three-way conversion catalytic coating, said particles having a volume based particle size distribution Dv90 in the range of from 11 to 21 micrometer, preferably in the range of from 11.5 to 17.5 micrometer, more preferably in the range of from 12 to 13 micrometer, wherein the volume based particle size distribution Dv90 is determined as described in Reference Example 4; and
        milling said slurry obtaining a slurry wherein the particles comprised in said slurry have a volume based particle size distribution Dv90 in the range of from 11 to 21 micrometer, preferably in the range of from 11.5 to 17.5 micrometer, more preferably in the range of from 12 to 13 micrometer;
    (ii.3) admixing the slurry obtained from (ii.1) and the slurry obtained from (ii.2), obtaining the washcoat slurry comprising a source of the three-way conversion catalytic coating.

33. The process of embodiment 32, wherein milling said slurry according to (ii.1) comprises, preferably consists of milling from 40 to 60 weight-%, preferably from 45 to 55 weight-% of said slurry obtaining a first slurry wherein the particles comprised in the first slurry have a volume based particle size distribution Dv90 in the range of from 16 to 21 micrometer, preferably in the range of from 17 to 21 micrometer, more preferably in the range of from 18 to 21 micrometer, milling the remaining portion of said slurry obtaining a second slurry wherein the particles comprised in the second slurry have a volume based particle size distribution Dv90 in the range of from 4 to 8 micrometer, preferably in the range of from 4.5 to 7 micrometer, more preferably in the range of from 5 to 6 micrometer, and combining said first slurry and said second slurry.

34. The process of embodiment 32 or 33, wherein milling said slurry according to (ii.2) comprises, preferably consists of milling from 40 to 60 weight-%, preferably from 45 to 55 weight-% of said slurry obtaining a first slurry wherein the particles comprised in the first slurry have a volume based particle size distribution Dv90 in the range of from 16 to 21 micrometer, preferably in the range of from 17 to 21 micrometer, more preferably in the range of from 18 to 21 micrometer, milling the remaining portion of said slurry obtaining a second slurry wherein the particles comprised in the second slurry have a volume based particle size distribution Dv90 in the range of from 4 to 8 micrometer, preferably in the range of from 4.5 to 7 micrometer, more preferably in the range of from 5 to 6 micrometer, and combining said first slurry and said second slurry.

35. The process of any one of embodiments 32 to 34, wherein according to (ii.1), the platinum group metal is one or more of ruthenium, palladium, rhodium, platinum, and iridium, more preferably one or more of palladium, rhodium, and platinum, more preferably one or more of palladium and rhodium, more preferably rhodium, wherein the source of a platinum group metal preferably comprises a salt of a platinum group metal, more preferably comprises a nitrate of a platinum group metal.

36. The process of any one of embodiments 32 to 35, wherein according to (ii.1), the refractory metal oxide support comprises aluminum, preferably comprises one or more of an aluminum oxide, a mixture of oxides comprising an aluminum oxide, and a mixed oxide comprising aluminum, wherein the mixed oxide comprising aluminum preferably additionally comprises one or more of zirconium, cerium, lanthanum, barium, and neodymium, wherein more preferably, the refractory metal oxide support comprises an aluminum oxide, more preferably a gamma aluminum oxide, wherein the refractory metal oxide support has a porosity preferably in the range of from 0.05 to 1.5 ml/g, more preferably in the range of from 0.1 to 1.0 ml/g, more preferably in the range of from 0.15 to 0.8 ml/g, wherein the porosity is determined according to Reference Example 1 herein.

37. The process of any one of embodiments 32 to 36, wherein according to (ii.1) and prior to admixing the platinum group metal supported on the refractory metal oxide with one or-more of an adjuvant and a source of a promotor, the refractory metal oxide source impregnated with the source of a platinum group metal is calcined in a gas atmosphere, preferably at a temperature of the gas atmosphere in the range of from 300 to 590° C., preferably in the range of from 300 to 570° C., more preferably in the range of from 300 to 550° C., the gas atmosphere preferably comprising oxygen.

38. The process of any one of embodiments 32 to 37, wherein according to (ii.1), the adjuvant is one or more of water, a polyacrylate, a methylcellulose, and an alcohol.

39. The process of any one of embodiments 32 to 38, wherein according to (ii.1), the source of a promotor is a source of one or more of a promotor comprising zirconium, a promotor comprising barium, a promotor comprising strontium, a promotor comprising lanthanum, a promotor comprising neodymium, a promotor comprising yttrium, a promotor comprising praseodymium, preferably one or more of a promotor comprising zirconium and a promotor comprising barium, more preferably a promotor comprising zirconium and a promotor comprising barium.

40. The process of embodiment 39, wherein according to (ii.1), the source of a promotor comprises a salt, preferably a nitrate, of the respective promotor element, more preferably zirconium nitrate and barium nitrate.

41. The process of any one of embodiments 32 to 40, wherein according to (ii.2), the platinum group metal is one or more of ruthenium, palladium, rhodium, platinum, and iridium, more preferably one or more of palladium, rhodium, and platinum, more preferably one or more of palladium and rhodium, more preferably palladium, wherein the source of a platinum group metal preferably comprises a salt of a platinum group metal, more preferably comprises a nitrate of a platinum group metal.

42. The process of any one of embodiments 32 to 41, wherein according to (ii.2), the oxygen storage compound comprises cerium, preferably comprises one or more of a cerium oxide, a mixture of oxides comprising a cerium oxide, and a mixed oxide comprising cerium, wherein the mixed oxide comprising cerium preferably additionally comprises one or more of zirconium, yttrium, neodynium, lanthanum, and praseodymium, more preferably additionally comprises one or more of zirconium, yttrium, neodynium, and lanthanum, more preferably additional comprises zirconium, yttrium, neodynium, and lanthanum, wherein the oxygen storage compound has a porosity preferably in the range of from 0.05 to 1.5 ml/g, more preferably in the range of from 0.1 to 1.0 ml/g, more preferably in the range of from 0.15 to 0.8 ml/g, wherein the porosity is determined according to Reference Example 1 herein.

43. The process of any one of embodiments 32 to 42, wherein according to (ii.2) and prior to admixing the platinum group metal supported on the oxygen storage compound with one or more of an adjuvant and a source of a promotor, the oxygen storage compound impregnated with the source of a platinum group metal is calcined in a gas atmosphere, preferably at a temperature of the gas atmosphere in the range of from 300 to 590° C., more preferably in the range of from 300 to 450° C., the gas atmosphere preferably comprising oxygen.

44. The process of any one of embodiments 32 to 43, wherein according to (ii.2), the adjuvant is one or more of water, a polyacrylate, a methylcellulose, and an alcohol, preferably octanol.

45. The process of any one of embodiments 32 to 44, wherein according to (ii.2), the source of a promotor is a source of one or more of a promotor comprising zirconium, a promotor comprising barium, a promotor comprising strontium, a promotor comprising lanthanum, a promotor comprising neodymium, a promotor comprising yttrium, a promotor comprising praseodymium, preferably one or more of a promotor comprising zirconium and a promotor comprising barium, more preferably a promotor comprising zirconium and a promotor comprising barium.

46. The process of embodiment 45, wherein according to (ii.2), the source of a promotor comprises a salt, preferably a nitrate, of the respective promotor element, more preferably zirconium nitrate and barium nitrate.

47. The process of any one of embodiments 27 to 46, wherein according to (i), the porous wall-flow substrate comprises, preferably consists of a cordierite, a silicon carbide, or an aluminum titanate.

48. The process of any one of embodiments 27 to 47, wherein according to (iii), coating the porous internal walls of the porous wall flow filter substrate provided in (i) with the particles of the washcoat slurry provided in (ii) comprises immersing the porous wall flow filter substrate into the washcoat slurry, exposing the porous wall flow filter substrate to the washcoat slurry for a period of time, preferably in the range of from 0.5 to 10 s, more preferably in the range of from 1 to 6 s, and removing the porous wall flow filter substrate from the washcoat slurry.

49. The process of embodiment 48, wherein the inlet passages of the porous wall flow filter substrate are exposed to the washcoat slurry and the outlet passages of the porous wall flow filter substrate are not exposed to the washcoat slurry, wherein the inlet passages are exposed to the washcoat slurry over x % of the substrate axial length, wherein $0<x\leq100$, preferably $50\leq x\leq100$, more preferably $75\leq x\leq100$, more preferably $90\leq x\leq100$, more preferably $95\leq x\leq100$, more preferably $99\leq x\leq100$.

50. The process of embodiment 48, wherein the outlet passages of the porous wall flow filter substrate are exposed to the washcoat slurry and the inlet passages of the porous wall flow filter substrate are not exposed to the washcoat slurry, wherein the outlet passages are exposed to the washcoat slurry over y % of the substrate axial length, wherein $0<y\leq100$, preferably $50\leq y\leq100$, more preferably $75\leq y\leq100$, more preferably $90\leq y\leq100$, more preferably $95\leq y\leq100$, more preferably $99\leq y\leq100$.

51. The process of embodiment 48, wherein the inlet passages and the outlet passages of the porous wall flow filter substrate are exposed to the washcoat slurry, wherein the inlet passages are exposed to the washcoat slurry over x % of the substrate axial length, wherein $0<x\leq100$, preferably $10\leq x\leq90$, more preferably $20\leq x\leq80$, more preferably $30\leq x\leq70$, more preferably $40\leq x\leq60$, more preferably $45\leq x\leq55$, wherein the outlet passages are exposed to the washcoat slurry over y % of the substrate axial length, wherein $0<y\leq100$, preferably $10\leq y\leq90$, more preferably $20\leq y\leq80$, more preferably $30\leq y\leq70$, more preferably $40\leq y\leq60$, more preferably $45\leq y\leq55$.

52. The process of any one of embodiments 48 to 51, wherein according to (iii), the porous wall flow filter substrate removed from the washcoat slurry is subjected to calcination in a gas atmosphere, preferably at a temperature of the gas atmosphere in the range of from 300 to 590° C., preferably in the range of from 400 to 590° C., more preferably in the range of from 450 to 590° C., the gas atmosphere preferably comprising oxygen.

53. A four-way conversion catalyst, preferably the four-way conversion catalyst according to any one of embodiments 1 to 26, obtainable or obtained or preparable or prepared by a process according to any one of embodiments 27 to 52.

54. The four-way conversion catalyst of embodiment 53, wherein the process according to any one of embodiments 27 to 52 consists of (i), (ii) and (iii).

55. An exhaust gas treatment system downstream of and in fluid communication with a gasoline engine, the system comprising a four-way conversion catalyst according to any one of embodiments 1 to 26, 53 and 54.

56. The exhaust gas treatment system of embodiment 56, wherein the gasoline engine is a gasoline direct injection engine.
57. The exhaust gas treatment system of embodiment 55 or 56, wherein the exhaust gas stream of the gasoline engine comprises hydrocarbon (HC), carbon monoxide (CO), nitrogen oxides (NOx), and particulates.
58. Use of a four-way conversion catalyst according to any one of embodiments 1 to 26, 53 and 54, for the treatment of an exhaust gas stream from a gasoline engine.
59. The use of embodiment 58, wherein the gasoline engine is a gasoline direct injection engine.
60. The use of embodiment 58 or 59, wherein the exhaust gas stream of the gasoline engine comprises hydrocarbon (HC), carbon monoxide (CO), nitrogen oxides (NOx), and particulates.
61. A method of treating an exhaust gas stream from a gasoline engine, comprising passing said exhaust gas stream through a four-way conversion catalyst according to any one of embodiments 1 to 26, 53 and 55.
62. The method of embodiment 60, wherein the gasoline engine is a gasoline direct injection engine.
63. The method of embodiment 61 or 62, wherein the exhaust gas stream of the gasoline engine comprises hydrocarbon (HC), carbon monoxide (CO), nitrogen oxides (NOx), and particulates.

The present invention is further illustrated by the following reference examples, examples, and comparative examples.

EXAMPLES

Reference Example 1: Measurement of the Porosity of the Porous Oxidic Compound The porosity of the porous oxidic compound, e.g. aluminum oxide or cerium-zirconium mixed oxide, was determined by physisorption of $N_2$ and analyzing the physisorption isotherms via BJH (Barett, Joyner, Halenda) analysis according to DIN 66134.

Reference Example 2: Measurement of the BET Specific Surface Area of Alumina The BET specific surface area of the alumina was determined according to DIN 66131 or DIN-ISO 9277 using liquid nitrogen.

Reference Example 3: Measurement of the Average Porosity and the Average Pore Size of the Porous Wall-Flow Substrate The average porosity of the porous wall-flow substrate was determined by mercury intrusion using mercury porosimetry according to DIN 66133 and ISO 15901-1.

Reference Example 4: Determination of the Volume-Based Particle Size Distributions The particle size distributions were determined by a static light scattering method using Sympatec HELOS (3200) & QUIXEL equipment, wherein the optical concentration of the sample was in the range of from 6 to 10%.

Reference Example 5: Determination of the Viscosity of a Washcoat Slurry

The slurry dynamic viscosities were measured with a HAAKE Rheostress 6000 manufactured by Thermo Fisher Scientific. Values reported here are measured at a shear rate of 300 1/s. Viscosity was measured at 20° C.

Reference Example 6: General Coating Method

In order to coat a porous wall-flow substrate with a three-way conversion coating according to the present invention, the wall-flow substrate was immersed vertically in a portion of the washcoat for a specific length of the substrate which was equal to the targeted length of the coating to be applied. In this manner, the washcoat contacted the porous walls of the substrate. The sample was left in the washcoat for a specific period of time, usually for 1-10 seconds. The substrate was then removed from the washcoat, and excess slurry was removed from the substrate by allowing it to drain from the substrate, then by blowing with compressed air (against the direction of washcoat penetration). The coated substrate was then calcined for 3 h at 450° C.

Comparative Example 1: FWC Catalyst with In-wall Coating Only

A porous wall-flow substrate having a three-way conversion (TWC) catalyst permeating the substrate wall (only inwall coating) was prepared at a washcoat loading of 1.48 g/in$^3$ (90 g/L) on a cordierite substrate sized 4.66*5 inches with 300 CPSI (cells per square inch), 8 mill wall thickness, average porosity of 65% and average pore size of 17 micrometers according to the following method:

(1) 1374 g of a high surface area gamma alumina (BET specific surface area=144 m$^2$/g; total pore volume=0.843 ml/g; mean pore radius=109 Angstrom) were impregnated with 121.5 g of a 8.51 weight-% aqueous solution of rhodium nitrate (Rh(NO$_3$)$_3$) with addition of 962 g deionized water. The Rh-impregnated alumina was calcined in air at a temperature of 590° C. for 3 h to form respective metal oxides. The calcined material was added to 2136 g deionized water containing 8 g n-octanol, 125 g 58.56 weight-% of barium nitrate (Ba(NO$_3$)$_2$) and 139 g 21.5 weight-% zirconium nitrate (Zr(NO$_3$)$_4$). The resulting mixture was milled using a continuous milling apparatus so that the Dv90 value of the particles was 4.82 micrometer. The particle size distribution was measured as described in Reference Example 4.

(2) 3748 g of an oxygen storage compound (OSC), a mixed oxide comprising Ce (40 weight-% calculated as CeO$_2$) and Zr (45 weight-% calculated as ZrO$_2$), and further comprising Nd, La, and Y (15 weight-% in total, each calculated as X$_2$O$_3$) and having a Dv90 value of 31 micrometer were impregnated with 179.1 g of a 19.64 weight-% aqueous solution of palladium nitrate (Pd(NO$_3$)$_2$)) together with addition of 1183 g of deionized water. The Pd-impregnated OSC was calcined at a temperature of 590° C. to form respective metal oxides. The calcined material was added to 5004 g of deionized water containing 8 g n-octanol, 290 g 58.56 weight-% of barium nitrate (Ba(NO$_3$)$_2$) and 209 g 21.5 weight-% zirconium nitrate (Zr(NO$_3$)$_4$). The resulting mixture was milled using the apparatus described above so that the Dv90 value of the particles was 4.92 micrometer. The particle size distribution was measured as described in Reference Example 4.

(3) The materials obtained from (1) and (2) were combined to form the final TWC washcoat. The finale slurry had a viscosity of 21.4 mPa·s, measured as described in Reference Example 5.

(4) The porous wall-flow substrate was coated with the washcoat obtained from (3) as described in Reference Example 6 hereinabove over 100% of the inlet from the inlet end.

Example 1: FWC Catalyst with In-wall Coating and On-wall Coating Comprising Alumina A porous wall-flow substrate having a three-way conversion (TWC) catalyst permeating the substrate wall (on-wall coating and in-wall coating) was prepared as described in Comparative Example 1 with following modifications:
(1) The resulting mixture with impregnated alumina was continuous ball milled to a Dv90 value of 13.82 micrometer.
(2) The resulting mixture with impregnated oxygen storage component was continuous ball milled to a Dv90 value of 13.13 micrometer.
(3) The final washcoat had a viscosity of 22.5 mPa·s.
(4) The porous wall-flow substrate was coated with the washcoat obtained from (3) as described in Reference Example 6 hereinabove over 50% of the inlet from the inlet end, 50% of the outlet from the outlet end, with a small overlap of about 3 mm.

Example 2: FWC Catalyst with In-wall Coating and On-wall Coating Comprising Alumina A porous wall-flow substrate having a three-way conversion (TWC) catalyst permeating the substrate wall (on-wall coating and in-wall coating) was prepared as described in Comparative Example 1 with following modifications:
(1) One half of the resulting resulting mixture with impregnated alumina was continuous ball milled to a Dv90 value of 4.97 micrometer, the other half was milled to a Dv90 of 18.37 micrometer.
(2) One half of the resulting mixture with impregnated oxygen storage component was continuous ball milled to a Dv90 value of 5.29 micrometer, the other half was milled to a Dv90 of 21.04 micrometer.
(3) The final slurry had a Dv90 value of 12.09 micrometer and a viscosity of 19.9 mPa·s.
(4) The porous wall-flow substrate was coated with the washcoat obtained from (3) as described in Reference Example 6 hereinabove over 50% of the inlet from the inlet end, 50% of the outlet from the outlet end, with a small overlap of about 3 mm.

Example 3: Cold Flow Backpressure Evaluation

The backpressure of the particulate filter obtained as described in Comparative Example 1 and Example 2 was measured on a SuperFlow Cold Flow bench SF-1020 Superbench at ambient conditions. The backpressure data recorded at a volume flow of 700 m³/h is reported in Table 1.

TABLE 1

Cold Flow Back Pressure Data

| | Back pressure/mbar |
|---|---|
| Comparative Example 1 | 77.17 |
| Example 1 | 88.04 |
| Example 2 | 74.90 |

The increase in backpressure of Example 1, compared to Comparative Example 1 where all the washcoat is in the wall of the filter, indicates the partial application of washcoat on the wall.

Example 4

The as-prepared filtration efficiencies of the particulate filters obtained as described in Comparative Example 1, Example 1 and Example 2 were measured on an engine bench (Daimler M274 TGDI 20. I engine). Prior to evaluation on the engine bench, the coated filter were canned in a stainless steel canning. Particle numbers were measured with an AVL particle counter (AVL TSI CPC 3791 plus) in tailpipe position after the canned filters at different static engine operating points and compared to the respective raw emission of the engine. The results are shown in Table 2.

TABLE 2

| | Filtration efficiency | | |
|---|---|---|---|
| Engine Set point | Filtration Efficiency[1] Comparative Example 1 | Filtration Efficiency[1] Example 1 | Filtration Efficiency[1] Example 2 |
| 25 kg/h, 475° C. | 68.6% | 85.3% | - not measured- |
| 50 kg/h, 574° C. | 48.6% | 68.1% | 77.8% |
| 100 kg/h, 681° C. | 50.5% | 66.3% | 70.9% |
| 150 kg/h, 753° C. | 48.7% | 63.6% | 66.7% |
| 200 kg/h, 792° C. | 48.9% | 62.4% | 64.1% |

[1]Filtration Efficiency = 100 − (100/PN raw emission)*PN after filter, PN = particulate number

Example 5

The particle filters of Comparative Example 1 and Example 1 were canned and measured under New European Drive Cycle (NEDC) in close-coupled (CC) position on a dynamic engine bench equipped with a 2.0 L direct-injection turbo engine. Emissions of particulate number according to the PMP protocol were measured for full systems and compared to the engine raw emission for calculation of the filtration efficiency. Results are shown in Table 3.

TABLE 3

NEDC Emission Results on engine bench

| | Comparative Example 1 | Example 1 | Engine raw emission |
|---|---|---|---|
| Particulate Number (#/km) | 5.39E10 | 3.805E10 | 1.7E11 |
| Filtration Efficiency based on engine raw emission | 68.2% | 77.6% | - not applicable - |

Example 1 shows improved filtration efficiency compared to Comparative Example 1.

Example 6

The particle filters of Comparative Example 1, Example 1 and Example 2 were embedded in a 410 mm canning and measured under Worldwide Harmonized Light-Duty Vehicle Test (WLTC) in close-coupled (CC) position on a dynamic engine bench equipped with a 2.0 L direct-injection turbo engine. Emissions of particulate number according to the PMP protocol were measured for full systems and compared to the engine raw emission for calculation of the filtration efficiency. Results are shown in Table 4.

TABLE 4

WLTC Emission Results

| | Comparative Example 1 | Example 1 | Example 2 | Engine raw emission |
|---|---|---|---|---|
| Particulate Number (#/km) | 5.99E10 | 4.97E10 | 4.77E10 | 1.26E11 |
| Filtration Efficiency based on engine raw emission | 52% | 60% | 62% | - not applicable - |

Example 1 shows improved filtration efficiency.

Example 7

The particle filters of Comparative Example 1 and Example 1 were canned and measured under New European Drive Cycle (NEDC) in underfloor (UF) position on a roller bench equipped with a 2.0 L direct-injection vehicle with Euro5 application. Emissions of particulate number according to the PMP protocol were measured for full systems in tailpipe position. Simultaneously the engine out emissions were measured and used as basis for efficiency calculation shown in Table 5.

TABLE 5

NEDC Emission Results

| | Comparative Example 1 | Example 1 |
|---|---|---|
| Particulate Number (#/km) Engine out | 2.81E12 | 2.82E12 |
| Particulate Number (#/km) tailpipe | 1.33E12 | 6.45E11 |
| Filtration Efficiency based on engine raw emission | 53% | 77% |

Example 1 shows improved filtration efficiency.

Comparative Example 2: FWC Catalyst with In-wall Coating Only

A porous wall-flow substrate having a three-way conversion (TWC) catalyst permeating the substrate wall (only in-wall coating) was prepared at a washcoat loading of 1.97 g/in$^3$ (120 g/L) on a cordierite substrate sized 4.66*4.72 inches with 300 CPSI (cells per square inch), 8 mill wall thickness, average porosity of 65% and average pore size of 17 micrometers according to the following method:
(1) 2067 g of a high surface area gamma alumina (BET specific surface area=100 m$^2$/g) were impregnated with 180.1 g of a 6.49 weight-% aqueous solution of rhodium nitrate (Rh(NO$_3$)$_3$) with addition of 1139 g deionized water. The Rh-impregnated alumina was calcined in air at a temperature of 590° C. for 3 h in atmosphere to form respective metal oxides. The calcined material was added to 3208 g deionized water containing 12 g n-octanol, 188 g 58.5 weight-% of barium nitrate (Ba(NO$_3$)$_2$) and 214 g 21.0 weight-% zirconium nitrate (Zr(NO$_3$)$_4$). The resulting mixture was milled using a continuous milling apparatus so that the Dv90 value of the particles was 5.77 micrometer. The particle size distribution was measured by static light scattering method using Sympatec HELOS (3200) & QUIXEL equipment.
(2) 5662 g of an oxygen storage compound (OSC), a mixed oxide comprising Ce (40 weight-% calculated as CeO$_2$) and Zr (45 weight-% calculated as ZrO$_2$), and further comprising Nd, La, and Y (15 weight-% in total, each calculated as X$_2$O$_3$) and having a Dv90 value of 31 micrometer were impregnated with 214.2 g of a 18.57 weight-% aqueous solution of palladium nitrate (Pd(NO$_3$)$_2$)) together with addition of 1824 g of deionized water. The Pd-impregnated OSC was calcined at a temperature of 590° C. to form respective metal oxides. The calcined material was added to 7518 g of deionized water containing 12 g n-octanol, 438 g 58.5 weight-% of barium nitrate (Ba(NO$_3$)$_2$) and 321 g 21.0 weight-% zirconium nitrate (Zr(NO$_3$)$_4$). The resulting mixture was milled using the apparatus described above so that the Dv90 value of the particles was 5.86 micrometer. The particle size distribution was measured by static light scattering method using Sympatec HELOS (3200) & QUIXEL equipment.
(3) The materials obtained from (1) and (2) were combined to form the final TWC washcoat. The final slurry had a viscosity of 24.8 mPa·s.
(4) The porous wall-flow substrate was coated with the washcoat obtained from (3) as described in Reference Example 6 by immersing 50% of the length of the substrate from the inlet side plus 3 mm followed by drying and calcining for 3 h at 450° C. then repeated immersion of 50% of the length of the substrate from the outlet side plus 3 mm followed by drying. The coated substrate was then calcined for 3 h at 450° C.

Example 8: FWC Catalyst with In-wall Coating and On-wall Coating Comprising Alumina A porous wall-flow substrate having a three-way conversion (TWC) catalyst permeating the substrate wall (on-wall coating and in-wall coating) was prepared as described in Comparative Example 2 with following modifications:
(1) One half of the resulting resulting mixture with impregnated alumina was continuous ball milled to a Dv90 value of 5.57 micrometer, the other half was milled to a Dv90 of 21.26 micrometer.
(2) One half of the resulting mixture with impregnated oxygen storage component was continuous ball milled to a Dv90 value of 5.77 micrometer, the other half was milled to a Dv90 of 20.04 micrometer.
(3) The final slurry had a Dv90 value of 14.44 micrometer and a viscosity of 10 mPa·s.
(4) The final slurry was coated as described in Reference Example 6 from inlet end only to 100% of the length of the substrate.

Example 9: FWC Catalyst with In-wall Coating and On-wall Coating Comprising Alumina A porous wall-flow substrate having a three-way conversion (TWC) catalyst permeating the substrate wall (on-wall coating and in-wall coating) was prepared as described in Example 8 with following modifications:
(4) The porous wall-flow substrate was coated with the washcoat obtained from (3) as described in Reference Example 6 by immersing 50% of the length of the inlet side of the substrate plus 3 mm followed by drying and calcining for 3 h at 450° C. then repeated immersion of 50% of the length of the outlet side of the substrate plus 3 mm followed by drying. The coated substrate was then calcined for 3 h at 450° C.

Example 10

The particle filters of Comparative Example 2, Example 8, and Example 9 were embedded in a 410 mm canning and measured under Worldwide Harmonized Light-Duty Vehicle Test (WLTC) in close-coupled (CC) position on a dynamic engine bench equipped with a 2.0 L direct-injection turbo engine. Emissions of particulate number according to the PMP protocol were measured for full systems and compared to the engine raw emission for calculation of the filtration efficiency. Results are shown in Table 6:

TABLE 6

WLTC results

| Sample | Filtration Efficiency |
| --- | --- |
| Comparative Example 2 | 55.3% |
| Example 8 | 75.5% |
| Example 9 | 68.1% |

Comparative Example 3: FWC Catalyst with In-wall Coating Only

A porous wall-flow substrate having a three-way conversion (TWC) catalyst permeating the substrate wall (only in-wall coating) was prepared at a washcoat loading of 1.97 g/in$^3$ (150 g/L) on a cordierite substrate sized 4.66*4.72 inches with 300 CPSI (cells per square inch), 8 mill wall thickness, average porosity of 65% and average pore size of 17 micrometers according to the following method.
(1) 2261 g of a high surface area gamma alumina (BET specific surface area=100 m$^2$/g) was impregnated with 257.1 g of a 8.1 weight-% aqueous solution of rhodium nitrate (Rh(NO$_3$)$_3$) with addition of 1493 g deionized water. The Rh-impregnated alumina was calcined in air at a temperature of 590° C. for 3 h in air atmosphere to form respective metal oxides. The calcined material was added to 3480 g deionized water containing 13 g n-octanol, 203 g 58.4 weight-% barium nitrate (Ba(NO$_3$)$_2$) and 231 g of a 21.0 weight-% zirconium nitrate (Zr(NO$_3$)$_4$). The resulting mixture was milled using a continuous milling apparatus so that the Dv90 value of the particles was 5.06 micrometer. The particle size distribution was measured by static light scattering method using Sympatec HELOS (3200) & QUIXEL equipment.
(2) 6129 g of an oxygen storage compound (OSC), a mixed oxide comprising Ce (40 weight-% calculated as CeO$_2$) and Zr (45 weight-% calculated as ZrO$_2$), and further comprising Nd, La, and Y (15 weight-% in total, each calculated as X$_2$O$_3$) and having a Dv90 value of 31 micrometer were impregnated with 987.9 g of a 18.98 weight-% aqueous solution of palladium nitrate (Pd(NO$_3$)$_2$)) together with addition of 1486 g of deionized water. The Pd-impregnated OSC was calcined at a temperature of 590° C. to form respective metal oxides. The calcined material was added to 8322 g of deionized water containing 13 g n-octanol, 475 g 58.4 weight-% barium nitrate (Ba(NO$_3$)$_2$) and 347 g 21.0 weight-% zirconium nitrate (Zr(NO$_3$)$_4$). The resulting mixture was milled using the apparatus described above so that the Dv90 value of the particles was 5.22 micrometer. The particle size distribution was measured by static light scattering method using Sympatec HELOS (3200) & QUIXEL equipment.
(3) The materials obtained from (1) and (2) were combined to form the final TWC washcoat. The final slurry had a viscosity of 23.2 mPa·s.
(4) The porous wall-flow substrate was coated as described in Reference Example 6 with the washcoat obtained from (3) by immersing 50% of the length of inlet side of the substrate plus 3 mm followed by drying and calcining for 3 h at 450° C. and then repeated immersion of 50% of the length of the outlet side of substrate plus 3 mm followed by drying. The coated substrate was then calcined for 3 h at 450° C.

Example 11: FWC Catalyst with In-wall Coating and On-wall Coating Comprising Alumina A porous wall-flow substrate having a three-way conversion (TWC) catalyst permeating the substrate wall (on-wall coating and in-wall coating) was prepared as described in Comparative Example 3 with following modifications:
(1) One half of the resulting resulting mixture with impregnated alumina was continuous ball milled to a Dv90 value of 5.57 micrometer, the other half was milled to a Dv90 of 21.39 micrometer.
(2) One half of the resulting mixture with impregnated oxygen storage component was continuous ball milled to a Dv90 value of 5.24 micrometer, the other half was milled to a Dv90 of 19.28 micrometer.
(3) The final slurry had a Dv90 value of 11.9 micrometer and a viscosity of 14.4 mPa·s.

Example 12

The particle filters of Comparative Example 3 and Example 12 were embedded in a 410 mm canning and measured under Worldwide Harmonized Light-Duty Vehicle Test (WLTC) in close-coupled (CC) position on a dynamic engine bench equipped with a 2.0 L direct-injection turbo engine. Emissions of particulate number according to the PMP protocol were measured for full systems and compared to the engine raw emission for calculation of the filtration efficiency. Results are shown in Table 7.

TABLE 7

WLTC results of Example 12

| Sample | Filtration Efficiency |
| --- | --- |
| Comparative Example 3 | 59.5% |
| Example 11 | 71.4% |

Comparative Example 4: FWC Catalyst with In-wall Coating Only

A porous wall-flow substrate having a three-way conversion (TWC) catalyst permeating the substrate wall was prepared at a washcoat loading of 0.98 g/in$^3$ (60 g/L) on a cordierite substrate sized 5.2*4 inches with 300 CPSI (cells per square inch), 8 mill wall thickness, average porosity of 65% and average pore size of 17 micrometers according to the following method:
(1) 2046 g of a high surface area gamma alumina (BET specific surface area=100 m$^2$/g) was impregnated with 247.5 of a 7.96 weight-% aqueous solution of rhodium nitrate ($Rh(NO_3)_3$) with addition of 1523 g deionized water. The Rh-impregnated alumina was calcined in air at a temperature of 590° C. for 3 h in air atmosphere to form respective metal oxides. The calcined material was added to 3221 g deionized water containing 12 g n-octanol, 188 g 58.7 weight-% of barium nitrate ($Ba(NO_3)_2$) and 224 g 20.2 weight-% zirconium nitrate ($Zr(NO_3)_4$). The resulting mixture was milled using a continuous milling apparatus so that the Dv90 value of the particles was 5.5 micrometer. The particle size distribution was measured by static light scattering method using Sympatec HELOS (3200) & QUIXEL equipment.

(2) 5656 g of an oxygen storage compound (OSC), a mixed oxide comprising Ce (40 weight-% calculated as $CeO_2$) and Zr (45 weight-% calculated as $ZrO_2$), and further comprising Nd, La, and Y (15 weight-% in total, each calculated as $X_2O_3$) and having a Dv90 value of 31 micrometer were impregnated with 59.5 g of a 18.9 weight-% aqueous solution of palladium nitrate (Pd $(NO_3)_2$)) together with addition of 1922 g of deionized water. The Pd-impregnated OSC was calcined at a temperature of 590° C. to form respective metal oxides. The calcined material was added to 7486 g of deionized water containing 12 g n-octanol, 438 g 58.7 weight-% of barium nitrate ($Ba(NO_3)_2$) and 336 g 20.2 weight-% zirconium nitrate ($Zr(NO_3)_4$). The resulting mixture was milled using the apparatus described above so that the Dv90 value of the particles was 4.77 micrometer. The particle size distribution was measured by static light scattering method using Sympatec HELOS (3200) & QUIXEL equipment.

(3) The materials obtained from (1) and (2) were combined to form the final TWC washcoat. The final slurry had a viscosity of 20.3 mPa·s and a Dv90 of 5.18 micrometer.

(4) The porous wall-flow substrate was coated with the washcoat obtained from (3) by immersing 100% of the inlet length of the substrate followed by drying. The coated substrate was calcined for 3 h at 450° C.

Example 13: FWC Catalyst with In-wall Coating and On-wall Coating Comprising Alumina A porous wall-flow substrate having a three-way conversion (TWC) catalyst permeating the substrate wall (on-wall and in-wall coating) was prepared as described in Comparative Example 4 with following modifications:

(1) One half of the resulting resulting mixture with impregnated alumina was continuous ball milled to a Dv90 value of 5.74 micrometer, the other half was milled to a Dv90 of 20.29 micrometer.

(2) One half of the resulting mixture with impregnated oxygen storage component was continuous ball milled to a Dv90 value of 5.05 micrometer, the other half was milled to a Dv90 of 19.51 micrometer.

(3) The final slurry had a Dv90 value of 15.89 micrometer.

Example 14

The particle filters of Comparative Example 4 and Example 13 were embedded in a 410 mm canning and measured under Worldwide Harmonized Light-Duty Vehicle Test (WLTC) in close-coupled (CC) position on a dynamic engine bench equipped with a 2.0 L direct-injection turbo engine. Emissions of particulate number according to the PMP protocol were measured for full systems and compared to the engine raw emission for calculation of the filtration efficiency. Results are shown in Table 8.

TABLE 8

| WLTC results of Example 14 | |
| --- | --- |
| Sample | Filtration Efficiency |
| Comparative Example 4 | 61.6% |
| Example 13 | 66.7% |

Comparative Example 5: FWC Catalyst with In-wall Coating Only

A porous wall-flow substrate having a three-way conversion (TWC) catalyst permeating the substrate wall was prepared at a washcoat loading of 1.23 g/in³ (75 g/L) on a cordierite substrate sized 4.66*4.72 inches with 300 CPSI (cells per square inch), 8 mill wall thickness, average porosity of 65% and average pore size of 17 micrometers according to the following method.

(1) 1272 g of a high surface area gamma alumina (BET specific surface area=100 m²/g) was impregnated with 156.2 g of a 7.37 weight-% aqueous solution of rhodium nitrate ($Rh(NO_3)_3$) with addition of 754 g deionized water. The Rh-impregnated alumina was calcined in air at a temperature of 590° C. for 3 h in air atmosphere to form respective metal oxides. The calcined material was added to 1983 g deionized water containing 7 g n-Octanol, 115 g 58.5 weight-% barium nitrate ($Ba(NO_3)_2$) and 129 g 21.4 weight-% zirconium nitrate ($Zr(NO_3)_4$). The resulting mixture was milled using a continuous milling apparatus so that the Dv90 value of the particles was 4.82 micrometer. The particle size distribution was measured by static light scattering method using Sympatec HELOS (3200) & QUIXEL equipment.

(2) 3448 g of an oxygen storage compound (OSC), a mixed oxide comprising Ce (40 weight-% calculated as $CeO_2$) and Zr (45 weight-% calculated as $ZrO_2$), and further comprising Nd, La, and Y (15 weight-% in total, each calculated as $X_2O_3$) and having a Dv90 value of 31 micrometer were impregnated with 206.4 g of a 18.97 weight-% aqueous solution of palladium nitrate ($Pd(NO_3)_2$)) together with addition of 1322 g of deionized water. The Pd-impregnated OSC was calcined at a temperature of 590° C. to form respective metal oxides. The calcined material was added to 4648 g of deionized water containing 7 g n-octanol, 269 g 58.5 weight-% barium nitrate ($Ba(NO_3)_2$) and 194 g 21.4 weight-% zirconium nitrate ($Zr(NO_3)_4$). The resulting mixture was milled using the apparatus described above so that the Dv90 value of the particles was 4.67 micrometer. The particle size distribution was measured by static light scattering method using Sympatec HELOS (3200) & QUIXEL equipment.

(3) The materials obtained from (1) and (2) were combined to form the final TWC washcoat. The final slurry had a viscosity of 22.5 mPa·s and a Dv90 of 4.68 micrometer.

(4) The porous wall-flow substrate was coated with the washcoat obtained from (3) by immersing 100% of the length from the inlet side of the substrate followed by drying. The coated substrate was then calcined for 3 h at 450° C.

Example 15: FWC Catalyst with In-wall Coating and On-wall Coating Comprising Alumina A porous wall-flow substrate having a three-way conversion (TWC) catalyst permeating the substrate wall (on-wall and in-wall coating) was prepared as described in Comparative Example 5 with following modifications:
(1) One half of the resulting resulting mixture with impregnated alumina was continuous ball milled to a Dv90 value of 5.79 micrometer, the other half was milled to a Dv90 of 20.25 micrometer.
(2) One half of the resulting mixture with impregnated oxygen storage component was continuous ball milled to a Dv90 value of 5.47 micrometer, the other half was milled to a Dv90 of 18.28 micrometer.
(3) The final slurry was milled to Dv90 value of 8.64 micrometer and had a viscosity of 12.9 mPa·s.

Example 16: FWC Catalyst with In-wall Coating and On-wall Coating Comprising Alumina A porous wall-flow substrate having a three-way conversion (TWC) catalyst permeating the substrate wall (on-wall and in-wall coating) was prepared as described in Comparative Example 5 with following modifications:
(1) One half of the resulting resulting mixture with impregnated alumina was continuous ball milled to a Dv90 value of 5.89 micrometer, the other half was milled to a Dv90 of 20.84 micrometer.
(2) One half of the resulting mixture with impregnated oxygen storage component was continuous ball milled to a Dv90 value of 5.85 micrometer, the other half was milled to a Dv90 of 21.36 micrometer.
(3) The final slurry had a Dv90 value of 11.98 micrometer and a viscosity of 10.8 mPa·s.

Example 17

The particle filters of Comparative Example 5, Example 15 and Example 16 were embedded in a 410 mm canning and measured under Worldwide Harmonized Light-Duty Vehicle Test (WLTC) in close-coupled (UF) position on a roller bench running a 1.4 L direct-injection Euro5 vehicle. Emissions of particulate number according to the PMP protocol were measured for full systems and compared to the engine raw emission for calculation of the filtration efficiency. Results are shown in Table 9.

TABLE 9

| Sample | Filtration Efficiency |
| --- | --- |
| Comparative Example 5 | 69.6% |
| Example 15 | 73.0% |
| Example 16 | 95.5% |

SHORT DESCRIPTION OF THE FIGURES

FIG. 1 shows a schematic section through a portion of a porous wall-flow substrate used according to the present invention prior to application of the coating. The reference numbers used in FIG. 1 stand for:
1a porous wall of the wall flow filter substrate
1b porous wall of the wall flow filter substrate
1c porous wall of the wall flow filter substrate
2 inlet passage defined by the porous internal walls 1a and 1b of the porous wall flow filter substrate
3 closed outlet end of the inlet passage 2
4 pore of the porous internal wall 1b of the wall flow filter substrate
5 outlet passage defined by the porous internal walls 1b and 1c of the porous wall flow filter substrate
6 pore of the porous internal wall 1c of the wall flow filter substrate
7 closed inlet end of the outlet passage 5

FIG. 2 shows a schematic section through the catalyst according to the present invention, in particular the inlet in-wall and on-wall coating. The reference numbers used in FIG. 2 stand for:
1 porous wall of the wall flow filter substrate
2 closed outlet end of the inlet passage 7
3 closed inlet end of the outlet passage 8
4 particle of the in-wall coating
5 particle of the on-wall coating
6 pore of the porous internal wall 1 of the wall flow filter substrate
7 inlet passage defined by the wall 1 of the porous wall flow filter substrate and another wall (not shown)
8 outlet passage defined by the wall 1 of the porous wall flow filter substrate and another wall (not shown)
The arrow at the left hand side of the figure indicates the inlet side of the catalyst.

FIG. 3 shows a schematic section through the catalyst according to the present invention, in particular the outlet in-wall and on-wall coating. The reference numbers used in FIG. 3 stand for:
1 porous wall of the wall flow filter substrate
2 closed outlet end of the inlet passage 7
3 closed inlet end of the outlet passage 8
4 particle of the in-wall coating
5 pore of the porous internal wall 1 of the wall flow filter substrate
6 particle of the on-wall coating
7 inlet passage defined by the wall 1 of the porous wall flow filter substrate and another wall thereof (not shown)
8 outlet passage defined by the wall 1 of the porous wall flow filter substrate and another wall (not shown)
The arrow at the left hand side of the figure indicates the inlet side of the catalyst.

CITED PRIOR ART

U.S. 2012/124974 A1

Figure 1:
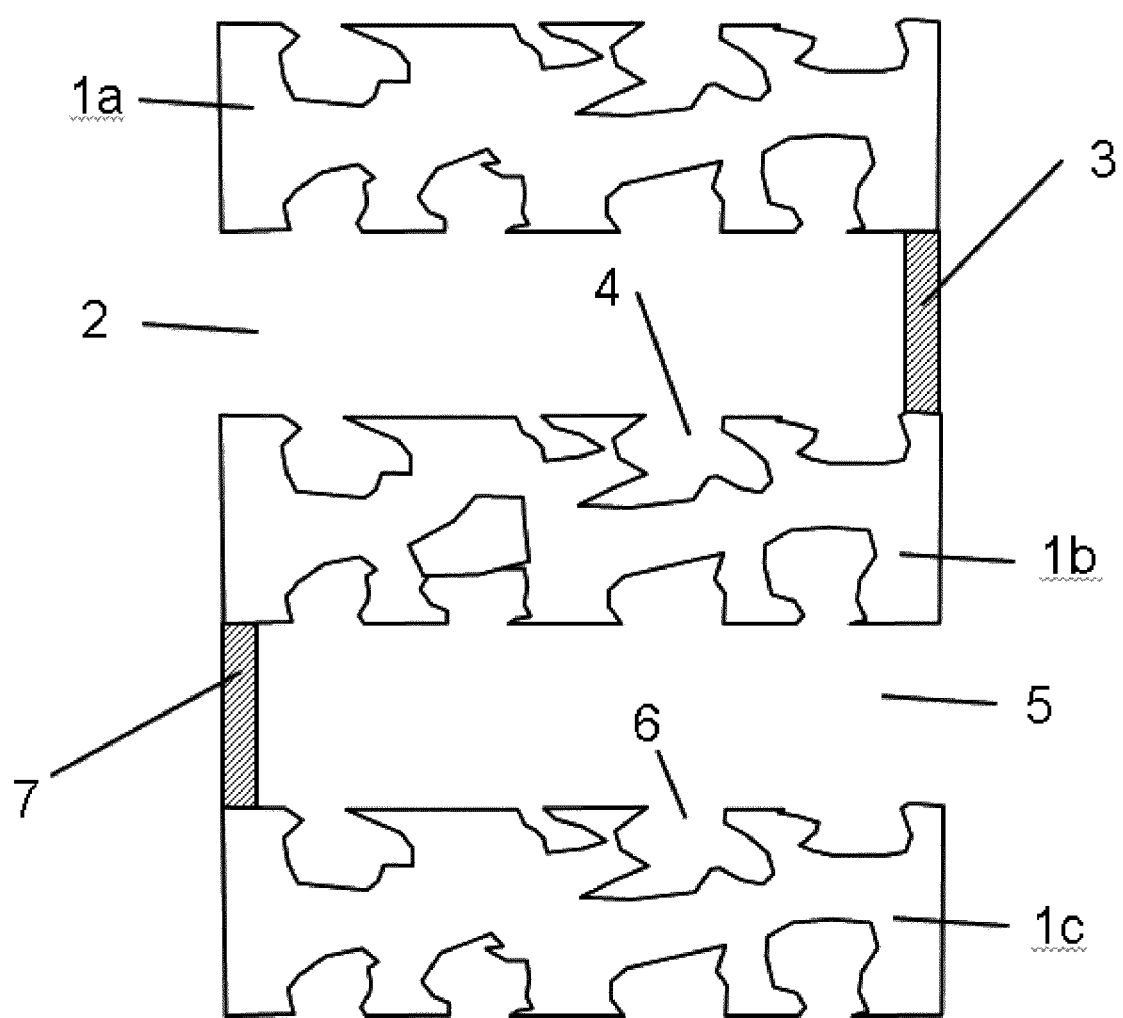
Figure 2:
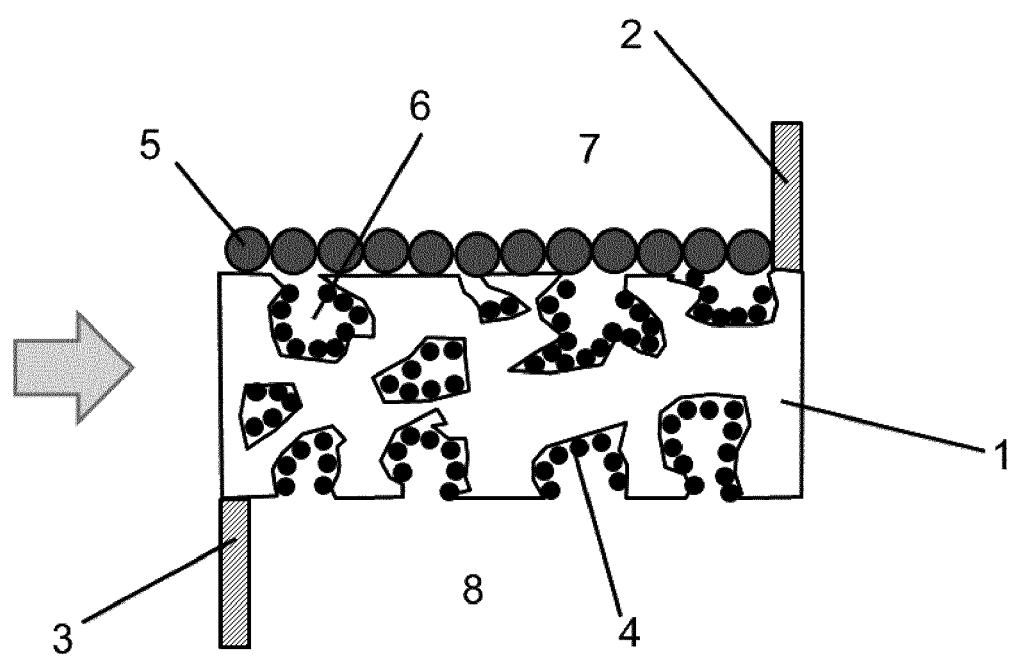
Figure 3:
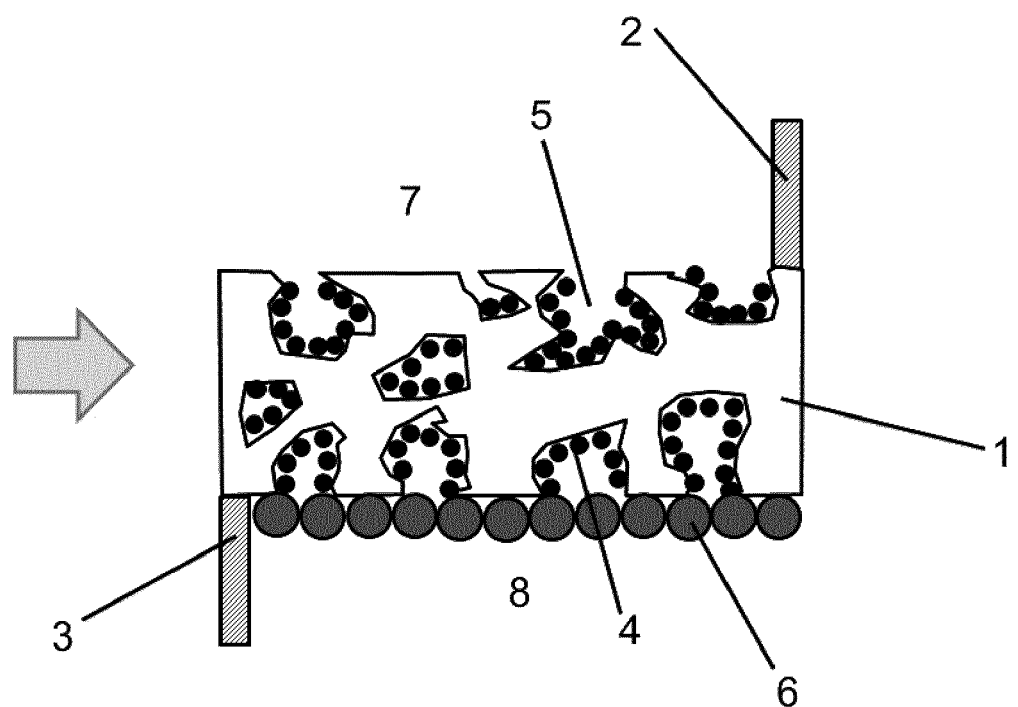
Figure 4:
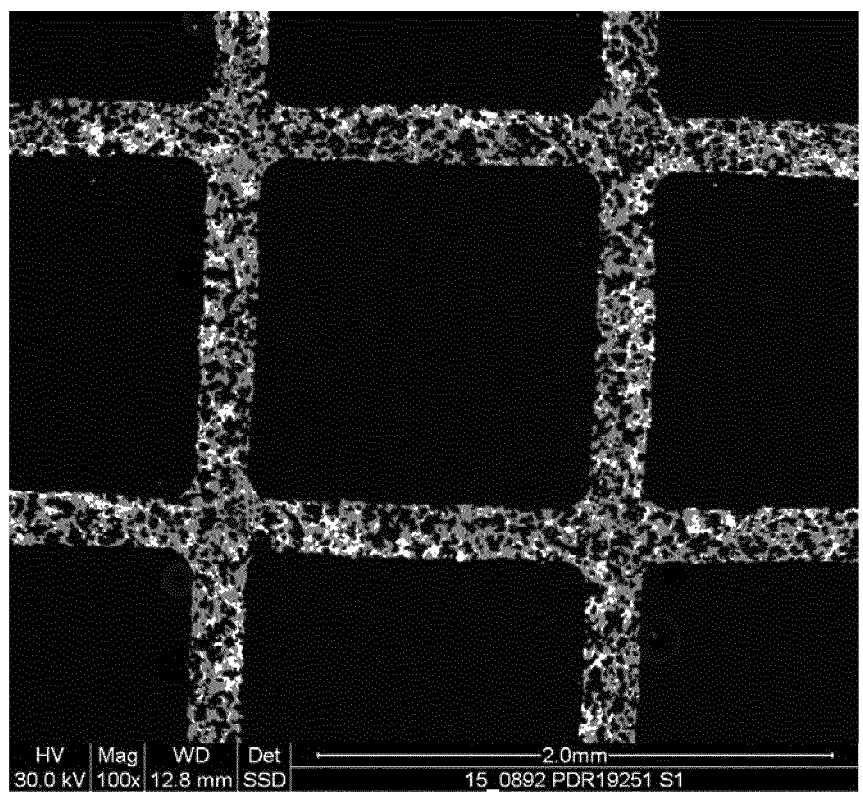
FIG. 4 shows a SEM picture of a portion of a coated substrate of standard four-way catalyst according to Comparative Example 1. According to this picture, the washcoat (bright portions) is completely in the pores of the internal walls the filter substrate.
Figure 5:
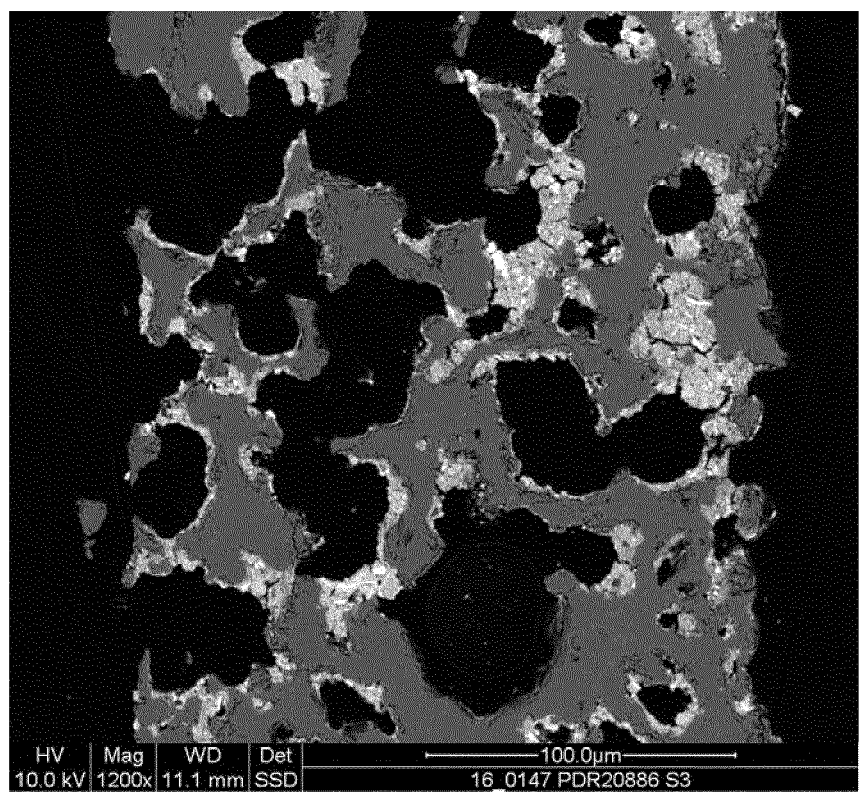
FIG. 5 shows a SEM picture of a portion of a coated substrate of standard four-way catalyst according to Comparative Example 1, compared to FIG. 4 an enlarged section. Also according to this picture, the washcoat (bright portions) is completely in the pores of the internal walls the filter substrate.
Figure 6:
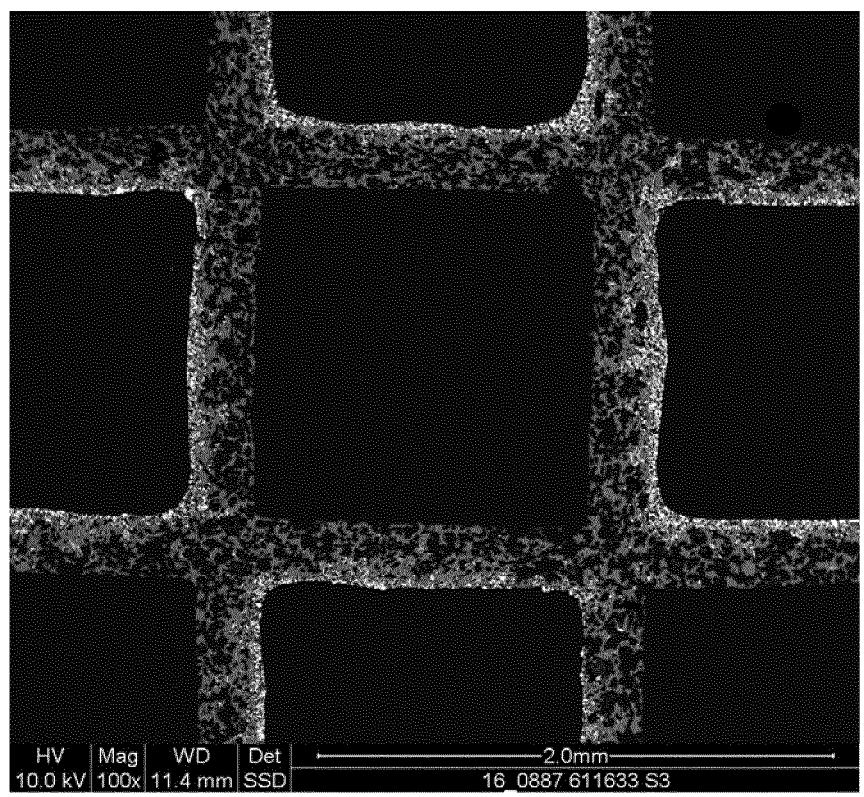
FIG. 6 shows a SEM picture of a portion of a coated substrate of four-way catalyst according to Example 1. According to this picture, a portion of the washcoat (bright portions) is present as on-wall coating, and a portion of the washcoat is in the pores as in-wall coating of the internal walls of the filter substrate.
Figure 7:
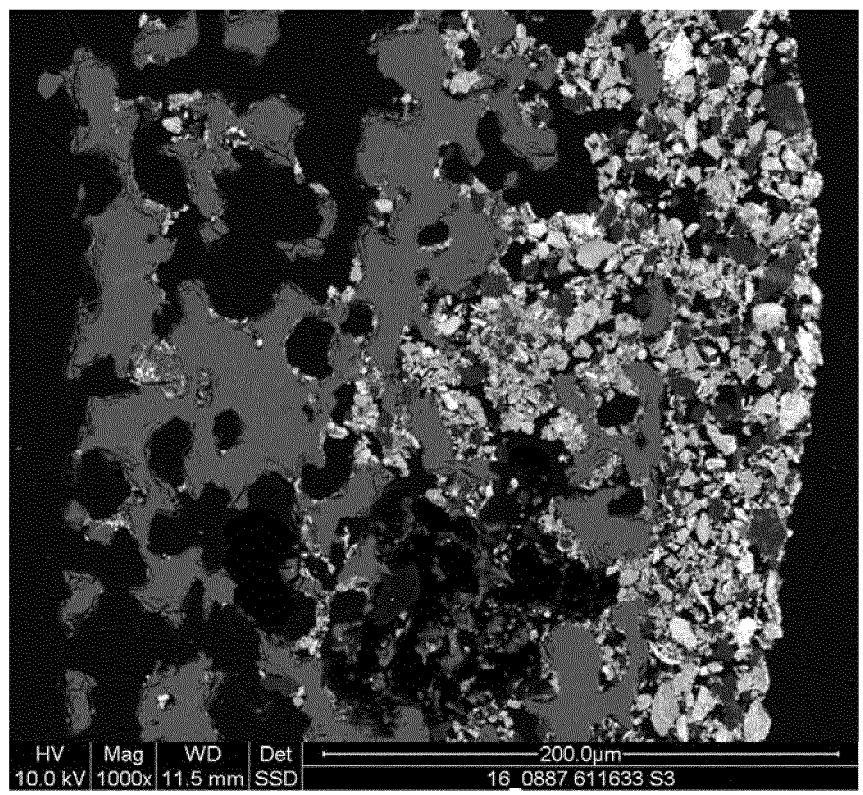
FIG. 7 shows a SEM picture of a portion of a coated substrate of four-way catalyst according to Example 1, compared to FIG. 6 an enlarged section According to this picture, a portion of the washcoat (bright portions) is present as on-wall coating, and a portion of the washcoat is in the pores as in-wall coating of the internal walls of the filter substrate.
Figure 8:
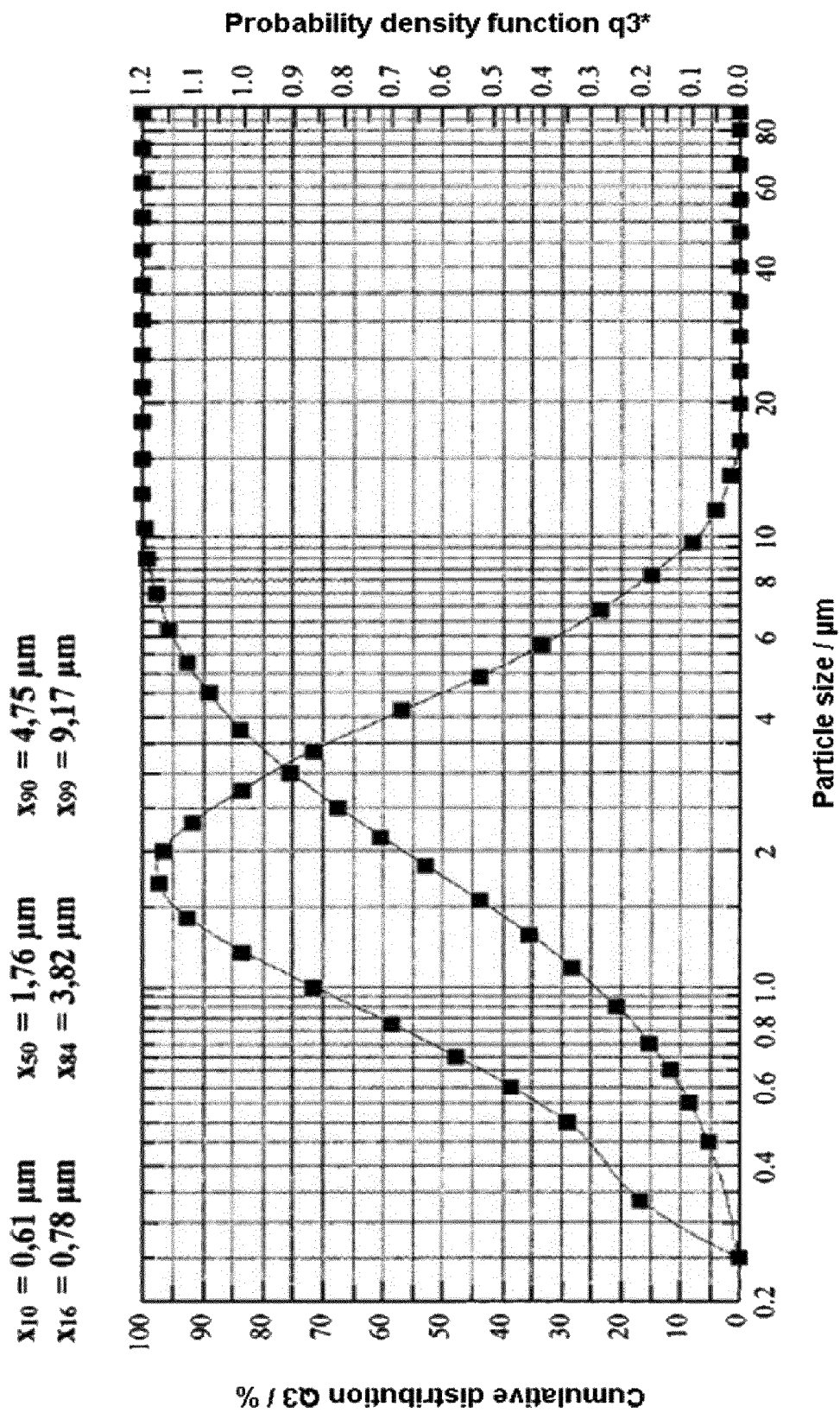
FIG. 8 shows the volume based particle size distribution curve of the washcoat slurry (combined slurry) obtained from (3) of Comparative Example 1.
Figure 9:
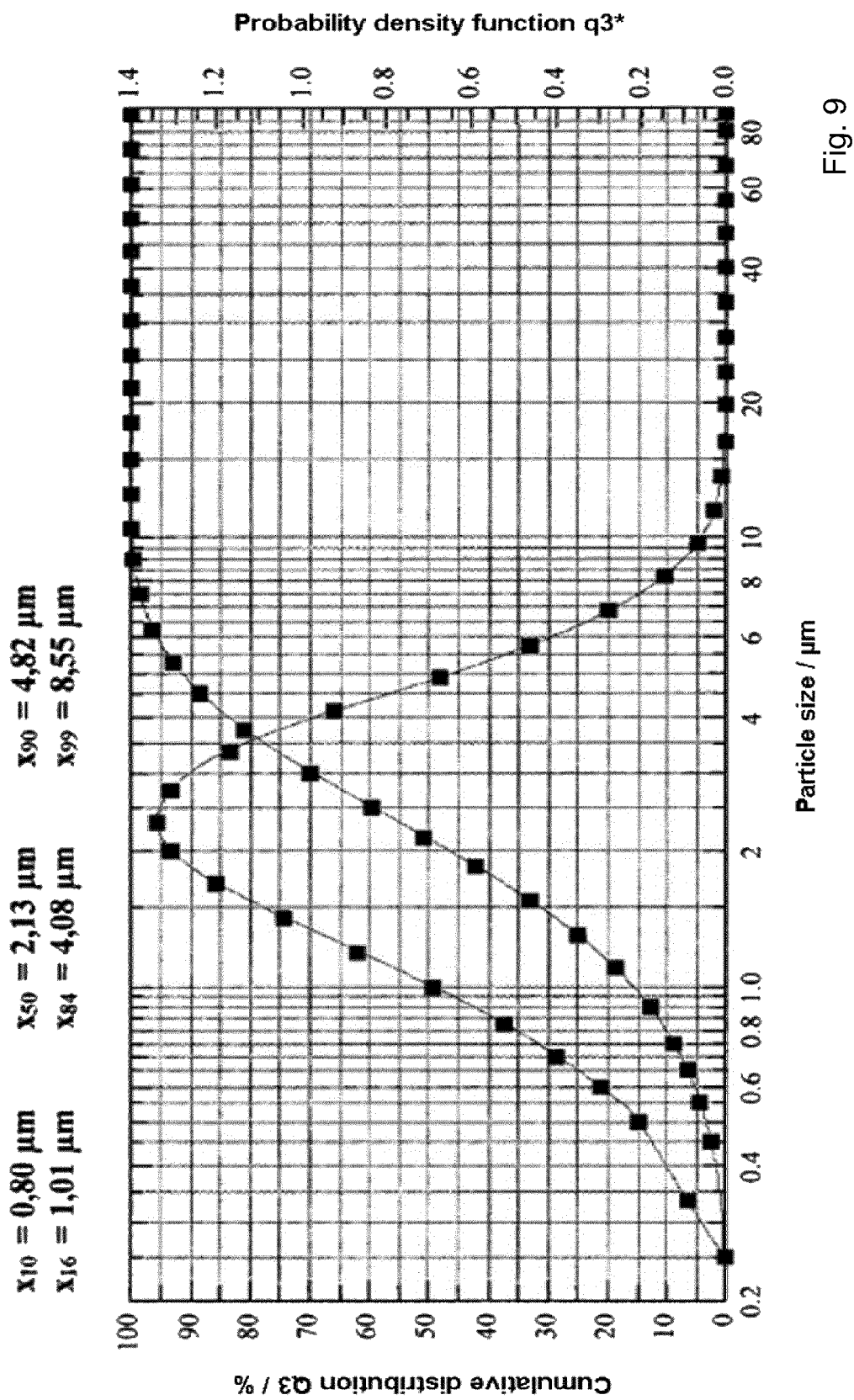
FIG. 9 shows the volume based particle size distribution curve of the slurry (alumina slurry) obtained from (1) of Comparative Example 1.
Figure 10:
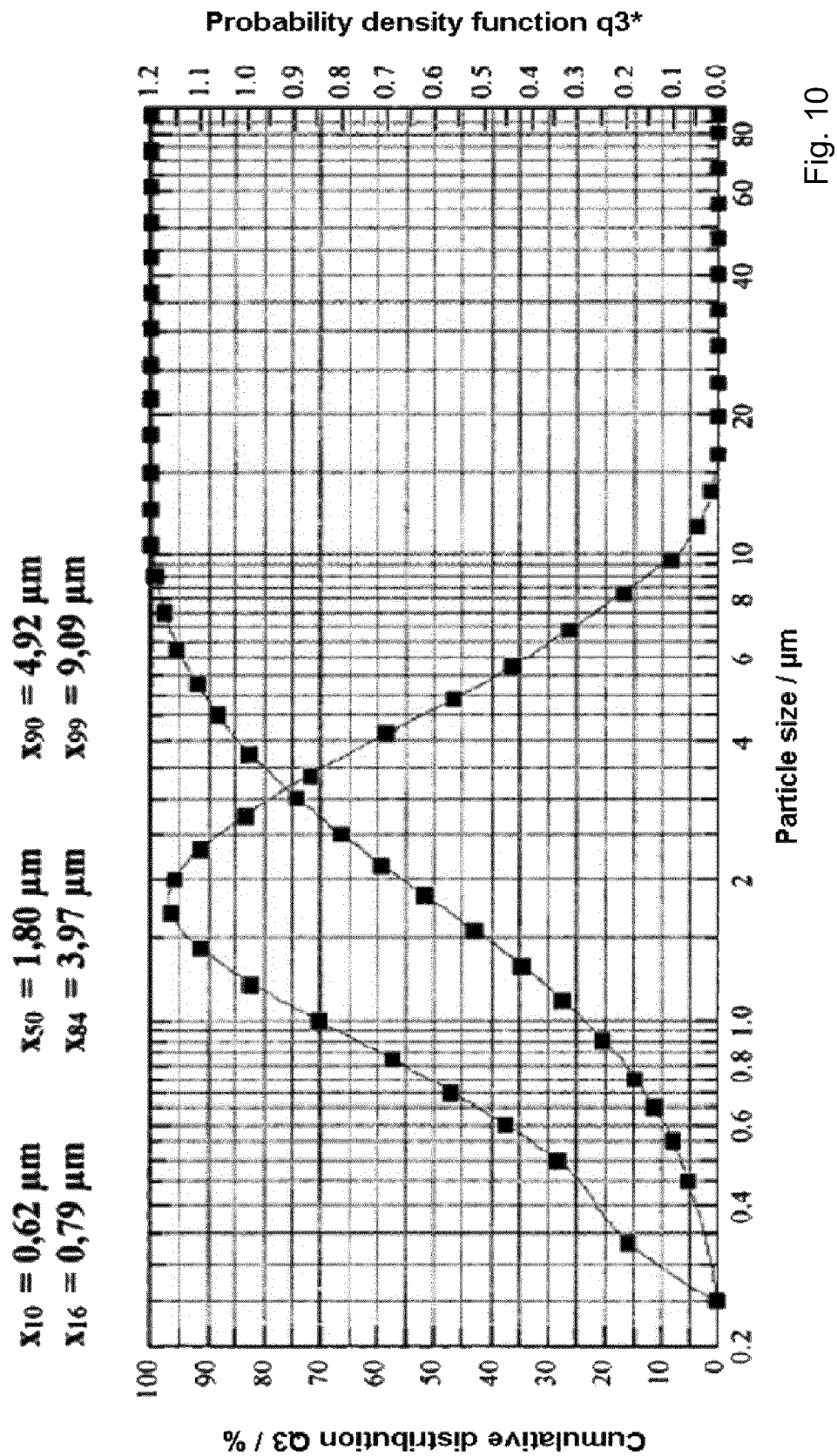
FIG. 10 shows the volume based particle size distribution curve of the slurry (OSC slurry) obtained from (2) of Comparative Example 1.
Figure 11:
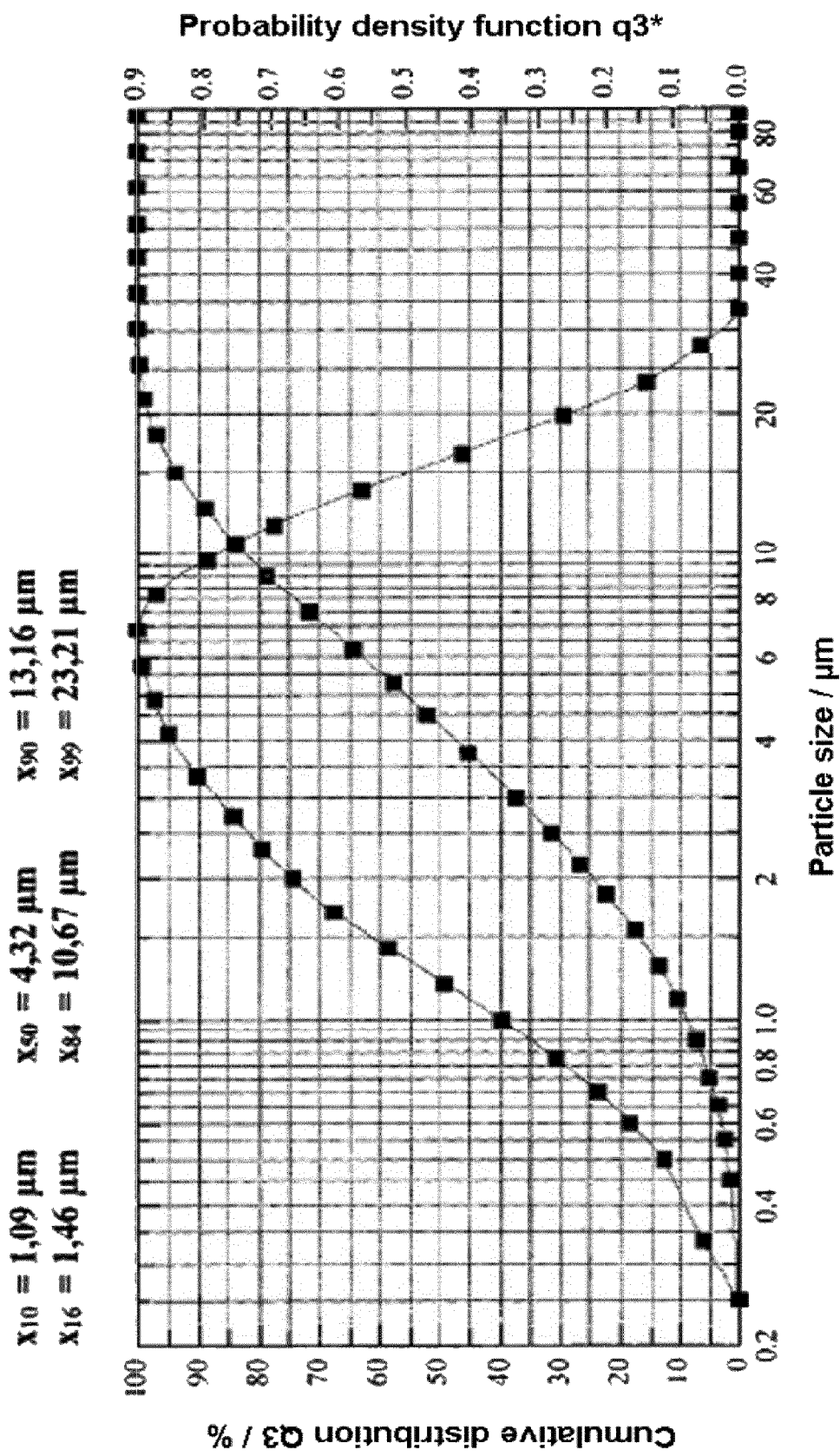
FIG. 11 shows the volume based particle size distribution curve of the washcoat slurry (combined slurry) obtained from (3) of Example 1.
Figure 12:
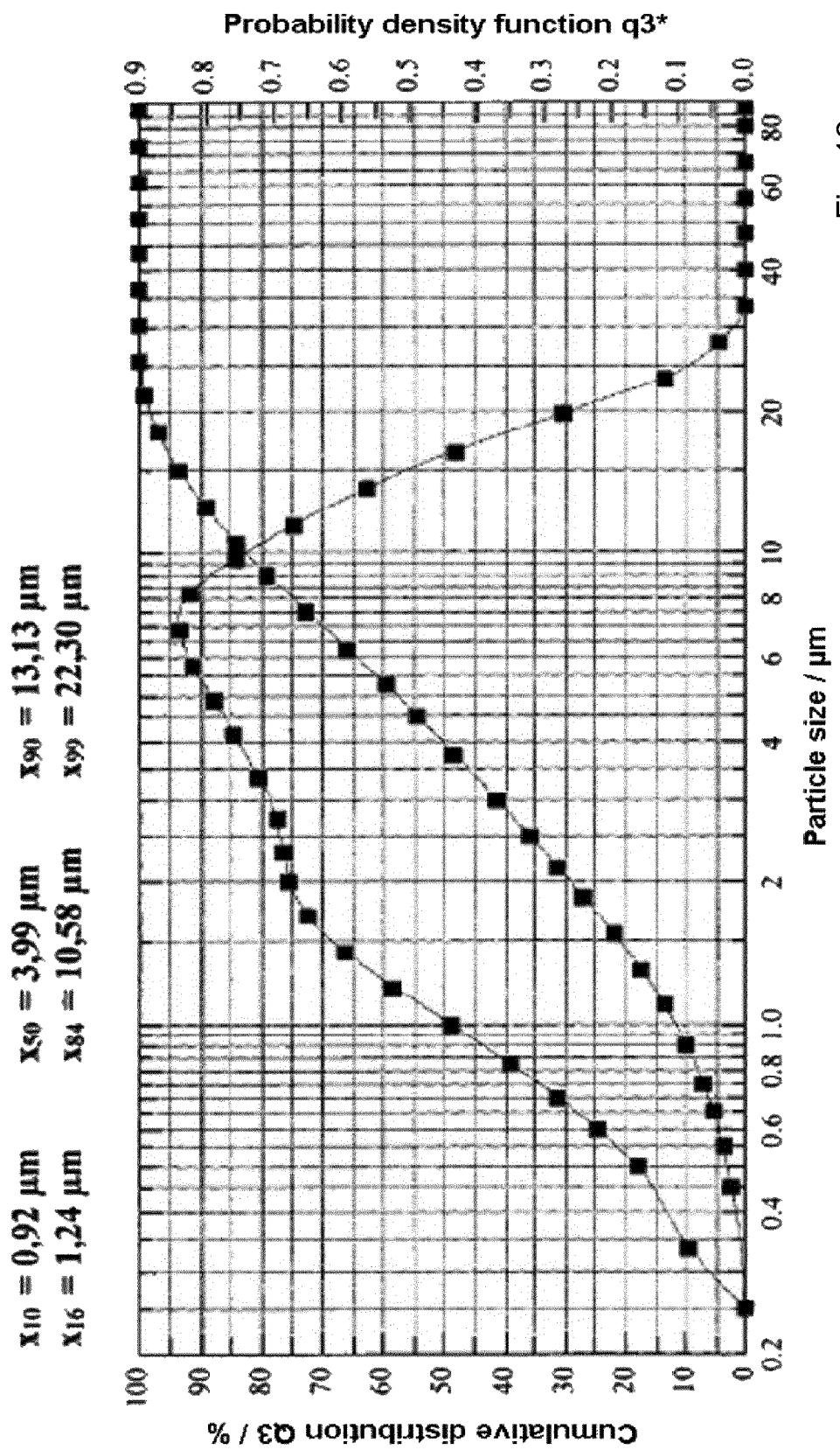
FIG. 12 shows the volume based particle size distribution curve of the slurry (OSC slurry) obtained from (2) of Example 1.
Figure 13:
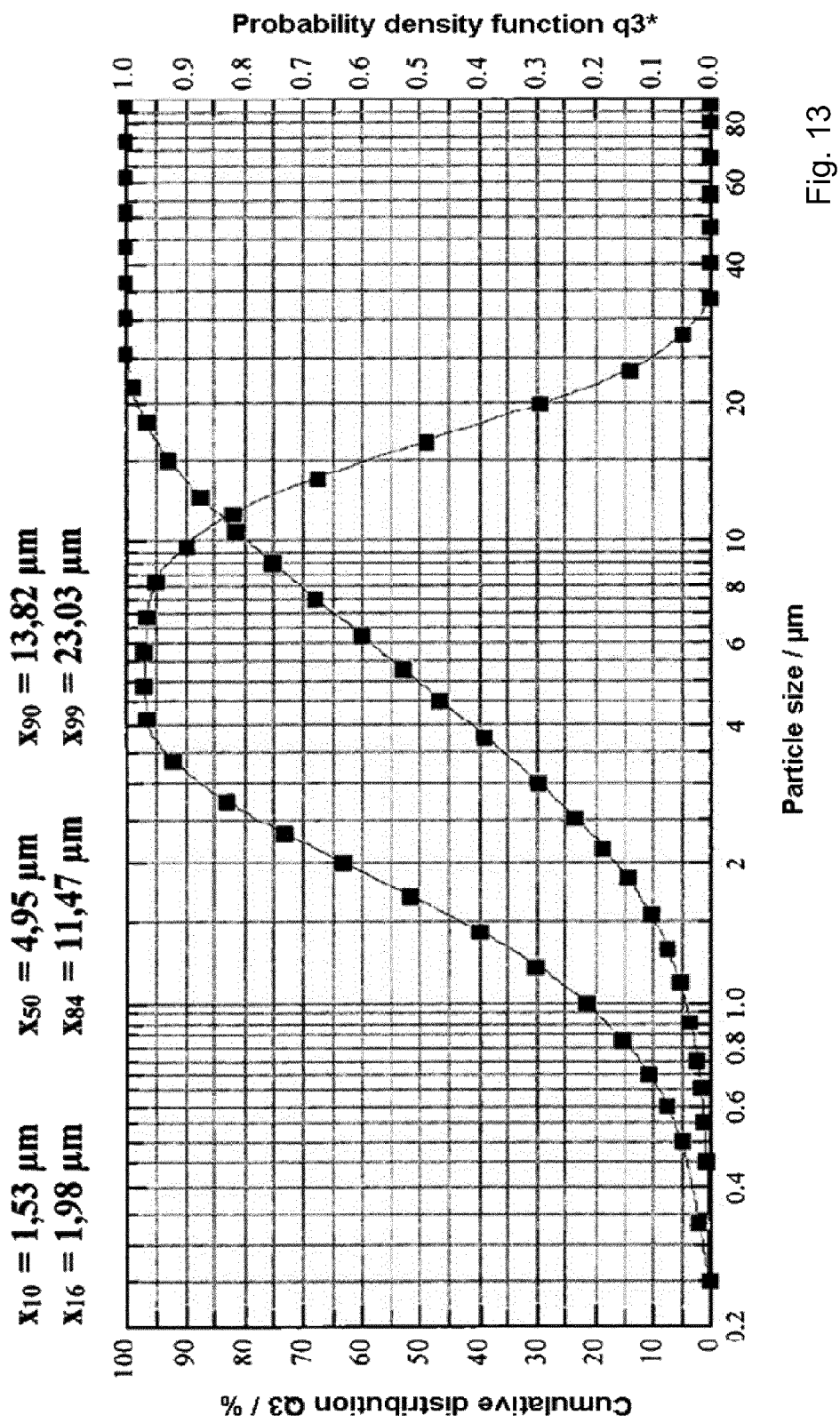
FIG. 13 shows the volume based particle size distribution curve of the slurry (alumina slurry) obtained from (1) of Example 1.

The invention claimed is:

1. A four-way conversion catalyst for the treatment of an exhaust gas stream of a gasoline engine, the catalyst comprising:
a porous wall-flow filter substrate comprising an inlet end, an outlet end, a substrate axial length extending between the inlet end and the outlet end, and a plurality of passages defined by porous internal walls of the porous wall-flow filter substrate,
wherein the plurality of passages comprise inlet passages having an open inlet end and a closed outlet end, and outlet passages having a closed inlet end and an open outlet end;
wherein the surface of the porous internal walls defines the interface between the porous internal walls and the passages, and
a three-way conversion catalytic coating comprising a platinum group metal supported on an oxygen storage compound, a platinum group metal supported on a refractory metal oxide support, and further comprising a promoter, wherein the promoter comprises zirconium and barium;
wherein in the pores of the porous internal walls, the three-way conversion catalytic coating is present as an in-wall coating;
wherein on the surface of the porous internal walls, the three-way conversion catalytic coating is present as an on-wall coating; and
wherein in addition to the three-way conversion catalytic coating, the catalyst comprises no further coating in the pores of the porous internal walls and no further coating on the surface of the porous internal walls;
wherein the four-way conversion catalyst is prepared by a process comprising
(i) providing the porous wall-flow filter substrate, wherein the internal walls have an average pore size in the range of from 9 to 22 micrometers, and wherein the average porosity of the internal walls of the internal walls is in the range of from 20 to 75%;
(ii) providing a washcoat slurry comprising particles of a source of the three-way conversion catalytic coating, said particles having a volume based particle size distribution Dv90 in the range of from 11 to 21 micrometers, comprising
(ii.1) impregnating a source of a platinum group metal onto a refractory metal oxide support;
admixing the platinum group metal supported on the refractory metal oxide with one or more of an adjuvant and a source of a promoter, obtaining a slurry comprising particles of a source of the three-way conversion catalytic coating, said particles having a volume based particle size distribution Dv90 of more than 21 micrometers; and
milling said slurry obtaining a slurry wherein the particles comprised in said slurry have a volume based particle size distribution Dv90 in the range of from 11 to 21 micrometers; wherein milling said slurry comprises milling from 40 to 60 weight-% of said slurry obtaining a first slurry wherein the particles comprised in the first slurry have a volume based particle size distribution Dv90 in the range of from 16 to 21 micrometers and milling the remaining portion of said slurry obtaining a second slurry wherein the particles comprised in the second slurry have a volume based particle size distribution Dv90 in the range of from 4 to 8 micrometers, and combining said first slurry and said second slurry;
(ii.2) impregnating a source of a platinum group metal onto an oxygen storage compound;
admixing the platinum group metal supported on the oxygen storage compound with one or more of an adjuvant and a source of a promoter, obtaining a slurry comprising particles of a source of the three-way conversion catalytic, said particles having a volume based particle size distribution Dv90 in the range of from 11 to 21 micrometers; and milling said slurry obtaining a slurry wherein the particles comprised in said slurry have a volume based particle size distribution Dv90 in the range of from 11 to 21 micrometers;
(ii.3) admixing the slurry obtained from (ii.1) and the slurry obtained from (ii.2), obtaining the washcoat slurry comprising a source of the three-way conversion catalytic coating;
(iii) coating the porous internal walls of the porous wall-flow filter substrate provided in (i) with the particles of the washcoat slurry provided in (ii).

2. The four-way conversion catalyst of claim 1, comprising the three-way conversion catalytic coating at a total loading, l(total), in the range of from 0.1 to 5
wherein the total loading is the sum of l(in-wall coating) and l(on-wall coating),
wherein l(in-wall coating) is the loading of the in-wall coating, and
wherein l(on-wall coating) is the loading of the on-wall coating.

3. The four-way conversion catalyst of claim 2, having a loading ratio of l(on-wall coating): l(in-wall coating) in the range of from 1:99 to 50:50.

4. The four-way conversion catalyst of claim 1, wherein from 95 to 100 weight % of the four-way conversion catalyst consists of the porous wall-flow filter substrate and the three-way conversion catalytic coating.

5. The four-way conversion catalyst of claim 4, which consists of the porous wall-flow filter substrate and the three-way conversion catalytic coating.

6. The four-way conversion catalyst of claim 1, wherein the porous internal walls comprising the in-wall coating have a relative average porosity in the range of from 20 to 99%, and wherein the relative average porosity is defined as the average porosity of the internal walls comprising the in-wall coating.

7. The four-way conversion catalyst of claim 1, wherein the porous internal walls comprising the in-wall coating have a relative average pore size in the range of from 10 to 21 micrometer, and
wherein the relative average pore size is defined as the average pore size of the internal walls comprising the in-wall coating relative to the average pore size of the internal walls not comprising the in-wall coating.

8. The four-way conversion catalyst of claim 7, wherein the average pore size of the internal walls not comprising the in-wall coating is in the range of from 9.5 to 21.5 micrometer.

9. The four-way conversion catalyst of claim 1, wherein the wall flow filter substrate comprises the three-way conversion catalytic coating at an inlet coating length of x % of the substrate axial length, wherein 0<x<100;
wherein the wall-flow filter substrate comprises the three-way conversion catalytic coating at an outlet coating length of y % of the substrate axial length, wherein 0<y<100; and
wherein x+y>0.

10. The four-way conversion catalyst of claim 9, wherein 0<x<5 or 0<y<5.

11. The four-way conversion catalyst of claim 1, wherein the platinum group metal is at least one selected from the group consisting of ruthenium, palladium, rhodium, platinum, and iridium.

12. The four-way conversion catalyst of claim 1, compound, wherein the oxygen storage compound has a porosity in the range of from 0.05 to 1.5 ml/g.

13. The four-way conversion catalyst of claim 1, wherein the refractory metal oxide support comprises aluminum oxide.

14. A process for preparing the four-way conversion catalyst of claim 1, comprising:
(i) providing a porous wall-flow filter substrate comprising an inlet end, an outlet end, a substrate axial length extending between the inlet end and the outlet end, and a plurality of passages defined by porous internal walls of the porous wall-flow filter substrate, wherein the plurality of passages comprise inlet passages having an open inlet end and a closed outlet end, and outlet passages having a closed inlet end and an open outlet end, wherein the internal walls have an average pore size in the range of from 9 to 22 micrometer, and wherein the average porosity of the internal walls of the internal walls is in the range of from 20 to 75%;
(ii) providing a washcoat slurry comprising particles of a source of the three-way conversion catalytic coating, said particles having a volume based particle size distribution Dv90 in the range of from 11 to 21 micrometer, wherein (ii) comprises:
(ii.1) impregnating a source of a platinum group metal onto a refractory metal oxide support;
admixing the platinum group metal supported on the refractory metal oxide with one or more of an adjuvant and a source of a promoter, obtaining a slurry comprising particles of a source of the three-way conversion catalytic coating, said particles having a volume based particle size distribution Dv90 of more than 21 micrometer; and
milling said slurry obtaining a slurry wherein the particles comprised in said slurry have a volume based particle size distribution Dv90 in the range of from 11 to 21 micrometer;
(ii.2) impregnating a source of a platinum group metal onto an oxygen storage compound;
admixing the platinum group metal supported on the oxygen storage compound with one or more of an adjuvant and a source of a promoter, obtaining a slurry comprising particles of a source of the three-way conversion catalytic coating, said particles having a volume based particle size distribution Dv90 in the range of from 11 to 21 micrometer; and
milling said slurry obtaining a slurry wherein the particles comprised in said slurry have a volume based particle size distribution Dv90 in the range of from 11 to 21 micrometer.
(ii.3) admixing the slurry obtained from (ii.1) and the slurry obtained from (ii.2), obtaining the washcoat slurry comprising a source of the three-way conversion catalytic coating; and
(iii) coating the porous internal walls of the porous wall-flow filter substrate provided in (i) with the particles of the washcoat slurry provided in (ii).

15. The process of claim 14, wherein
milling said slurry according to (ii.1) comprises:
obtaining a first slurry wherein the particles comprised in the first slurry have a volume based particle size distribution Dv90 in the range of from 16 to 2 1 micrometer,
milling the remaining portion of said slurry obtaining a second slurry wherein the particles comprised in the second slurry have a volume based particle size distribution Dv90 in the range of from 4 to 8 micrometer; and
combining said first slurry and said second slurry,
and/or
wherein milling said slurry according to (ii.2) comprises:
obtaining a first slurry wherein the particles comprised in the first slurry have a volume based particle size distribution Dv90 in the range of from 16 to 21 micrometer;
milling the remaining portion of said slurry obtaining a second slurry wherein the particles comprised in the second slurry have a volume based particle size distribution Dv90 in the range of from 4 to 8 micrometer; and
combining said first slurry and said second slurry.

16. The process of claim 14, wherein according to (iii), coating the porous internal walls of the porous wall-flow filter substrate provided in (i) with the particles of the washcoat slurry provided in (ii) comprises immersing the porous wall-flow filter substrate into the washcoat slurry, exposing the porous wall-flow filter substrate to the washcoat slurry for a period of time, and removing the porous wall-flow filter substrate from the washcoat slurry,
wherein the inlet passages of the porous wall-flow filter substrate are exposed to the washcoat slurry and the outlet passages of the porous wall-flow filter substrate are not exposed to the washcoat slurry, wherein the inlet passages are exposed to the washcoat slurry over x % of the substrate axial length, wherein 0<x<100, or
wherein the outlet passages of the porous wall-flow filter substrate are exposed to the washcoat slurry and the inlet passages of the porous wall-flow filter substrate are not exposed to the washcoat slurry, wherein the outlet passages are exposed to the washcoat slurry over y % of the substrate axial length, wherein 0<y<100, or wherein the inlet passages and the outlet passages of the porous wall flow filter substrate are exposed to the washcoat slurry, wherein the inlet passages are exposed to the washcoat slurry over x % of the substrate axial length, wherein 0<x<100, wherein the outlet passages are exposed to the washcoat slurry over y % of the substrate axial length, wherein 0<y<100.

17. An exhaust gas treatment system downstream of and in fluid communication with a gasoline engine, the system comprising the four-way conversion catalyst claim 1.

18. A method of treating an exhaust gas stream from a gasoline engine, comprising contacting the exhaust gas stream with the four-way conversion catalyst of claim 1.

* * * * *